US008412525B2

(12) United States Patent
Mukerjee et al.

(10) Patent No.: US 8,412,525 B2
(45) Date of Patent: Apr. 2, 2013

(54) NOISE ROBUST SPEECH CLASSIFIER ENSEMBLE

(75) Inventors: Kunal Mukerjee, Redmond, WA (US); Kazuhito Koishida, Redmond, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 12/433,143

(22) Filed: Apr. 30, 2009

(65) Prior Publication Data

US 2010/0280827 A1    Nov. 4, 2010

(51) Int. Cl.
*G10L 15/04* (2006.01)
*G10L 15/20* (2006.01)
*G06F 17/30* (2006.01)

(52) U.S. Cl. ......... 704/254; 704/233; 704/240; 707/706

(58) Field of Classification Search ............. None
See application file for complete search history.

(56) References Cited

U.S. PATENT DOCUMENTS

| | | | |
|---|---|---|---|
| 5,734,793 A * | 3/1998 | Wang | 704/232 |
| 6,456,991 B1 * | 9/2002 | Srinivasa et al. | 706/20 |
| 6,873,993 B2 * | 3/2005 | Charlesworth et al. | 707/740 |
| 6,931,351 B2 * | 8/2005 | Verma et al. | 702/182 |
| 7,254,538 B1 | 8/2007 | Hermansky et al. | |
| 7,424,427 B2 * | 9/2008 | Liu et al. | 704/256.1 |
| 7,444,282 B2 * | 10/2008 | Choo et al. | 704/202 |
| 8,229,744 B2 * | 7/2012 | Dharanipragada et al. | 704/256 |
| 2008/0059156 A1 | 3/2008 | Han et al. | |
| 2008/0059168 A1 * | 3/2008 | Eide | 704/231 |
| 2008/0172233 A1 | 7/2008 | Smaragdis et al. | |
| 2009/0006102 A1 * | 1/2009 | Kan et al. | 704/500 |
| 2010/0121638 A1 * | 5/2010 | Pinson et al. | 704/235 |

FOREIGN PATENT DOCUMENTS

WO    WO2007131530    11/2007

OTHER PUBLICATIONS

Meinedo et al., "Combination of acoustic models in continuous speech recognition hybrid systems", in Proceedings ICSLP 2000, Beijing, China, 2000.*
Bilmes et al., "Generalized rules for combination and joint training of classifiers", Pattern Analysis and Applications 6, 201-211, 2003.*
Patricia Scanlon; Daniel P. W. Ellis; Richard B. Reilly; , "Using Broad Phonetic Group Experts for Improved Speech Recognition," Audio, Speech, and Language Processing, IEEE Transactions on , vol. 15, No. 3, pp. 803-812, Mar. 2007.*
Huang, X.D.; , "Phoneme classification using semicontinuous hidden Markov models ," Signal Processing, IEEE Transactions on , vol. 40, No. 5, pp. 1062-1067, May 1992.*

(Continued)

*Primary Examiner* — Brian Albertalli
(74) *Attorney, Agent, or Firm* — Lee & Hayes, PLLC

(57) ABSTRACT

Embodiments for implementing a speech recognition system that includes a speech classifier ensemble are disclosed. In accordance with one embodiment, the speech recognition system includes a classifier ensemble to convert feature vectors that represent a speech vector into log probability sets. The classifier ensemble includes a plurality of classifiers. The speech recognition system includes a decoder ensemble to transform the log probability sets into output symbol sequences. The speech recognition system further includes a query component to retrieve one or more speech utterances from a speech database using the output symbol sequences.

20 Claims, 17 Drawing Sheets

OTHER PUBLICATIONS

Schwenk, H.; , "Using boosting to improve a hybrid HMM/neural network speech recognizer," Acoustics, Speech, and Signal Processing, 1999. Proceedings., 1999 IEEE International Conference on , vol. 2, no., pp. 1009-1012 vol. 2, Mar. 15-19, 1999.*

Cook, G.; Robinson, T.; , "Boosting the performance of connectionist large vocabulary speech recognition," Spoken Language, 1996. ICSLP 96. Proceedings., Fourth International Conference on , vol. 3, no., pp. 1305-1308 vol. 3, Oct. 3-6, 1996.*

Wechsler et al., "Speech Retrieval Based on Automatic Indexing", Proceedings of the Final Workshop on Multimedia Information Retrieval (MIRO'95), Electronic Workshops in Computing, 1995.*

U.S. Appl. No. 11/923,430, filed Oct 24, 2007, Thompson et al., "Sequential Compressed Pattern Index".

Bottou, et al., "Graph Transformer Networks for Image Recognition", retrieved on Feb. 25, 2009 at <<http://yann.lecun.com/exdb/publis/pdf/bottou-05.pdf>>, Bulletin of the Intl Statistical Institute, 2005, 4 pages.

Chen, et al., "Atomic Decomposition by Basis Pursuit", retrieved on Feb. 25, 2009 at <<http://www.stat.stanford.edu/~donoho/Reports/1995/30401.pdf>>, SIAM Review, vol. 43, No. 1, Mar. 2001, pp. 1-29.

Divakaran, et al., "Video Mining Using Combinations of Unsupervised and Supervised Learning Techniques", retrieved on Feb. 25, 2009 at <<http://www.merl.com/reports/docs/TR2004-007.pdf>>, SPIE Conf on Storage and Retrieval for Multimedia Databases, 2004, 13 pages.

El-Maleh, et al., "Frame-Level Noise Classification in Mobile Environments", retrieved on Feb. 25, 2009 at <<http://www.ece.mcgill.ca/pkabal/papers/1998/SG_12_Q17McGill.pdf>>, Proc 1999 IEEE Intl Conf on Acoustics, Speech and Signal Processing, vol. 1, pp. 1-11.

Goodman, et al., "A Gaussian Mixture Model Classifier Using Supervised and Unsupervised Learning", retrieved on Feb. 25, 2009 at <<http://ieeexplore.ieee.org/stamp/stamp.jsp?arnumber=00615102>>, International Symposium on Signal Processing and its Applications, ISSPA, Gold Coast, Australia, Aug. 25-30, 1996, pp. 565-566.

Hung et al., "Spoken Language Processing: A Guide to Theory, Algorithm and System Development", 2001, Prentice Hall publisher, pp. 316-318.

Kuncheva, "A Theoretical Study on Six Classifier Fusion Strategies", retrieved on Feb. 25, 2009 at <<http://ieeexplore.ieee.org/stamp/stamp.jsp?arnumber=982906&isnumber=21179>>, IEEE Transactions on Pattern Analysis and Machine Intelligence, vol. 24, No. 2, Feb. 2002, pp. 281-286.

Nishida, et al., "Speaker Model Selection Based on the Bayesian Information Criterion Applied to Unsupervised Speaker Indexing", retrieved on Feb. 25, 2009 at <<http://ieeexplore.ieee.org/ielx5/89/21596/101109TSA2005848890.pdf>>, IEEE Transactions on Speech and Audio Processing, 2005, pp. 1-10.

Rissanen, "A Universal Prior for Integers and Estimation by Minimum Description Length", retrieved on Feb. 25, 2009 at <<http://projecteuclid.org/DPubS/Repository/1.0/Disseminate?view=body&id=pdf_1&handle=euclid.aos/1176346150>>, The Annals of Statistics, 1983, vol. 11, No. 2, 416-431.

Schapire, "Theoretical Views of Boosting", Proc 4th European Conf Computation Learning Theory, 1999, pp. 1-10.

Sklar, "A Primer on Turbo Code Concepts", IEEE Communications Mag, Dec. 1997, vol. 35, No. 12, pp. 94-102.

Young, et al., "The HTK Book", retrieved on Feb. 25, 2009 at <<http://nesl.ee.ucla.edu/projects/ibadge/docs/ASR/htk/htkbook.pdf>>, 1995-1999 Microsoft Corporation, 277 pages.

Breimain, "Combining Predictors", Combining Artificial Neural Nets, A. Sharkey ed. 1999, pp. 31-50.

Duda et al., "Pattern Classification", 2nd edition, Wiley, 2001, 338 pgs.

Redner et al., "Mixture Densities, Maximum Likelihood and the EM Algorithm", SIAM Review, vol. 26, Issue 2, 1984, pp. 195-239.

* cited by examiner

FIGURE 5

| | | 0 | 1 | 2 | 3 | 4 | 5 | 6 | 7 | 8 | 9 | 10 |
|---|---|---|---|---|---|---|---|---|---|---|---|---|
| | 0 | 0 | 1 | 2 | 3 | 4 | 5 | 6 | 7 | 8 | 9 | 10 |
| | 1 | 11 | 12 | 13 | 14 | 15 | 16 | 17 | 18 | 19 | 20 | 21 |
| | 2 | 22 | 23 | 24 | 25 | 26 | 27 | 28 | 29 | 30 | 31 | 32 |
| | 3 | 33 | 34 | 35 | 36 | 37 | 38 | 39 | 40 | 41 | 42 | 43 |
| | 4 | 44 | 45 | 46 | 47 | 48 | 49 | 50 | 51 | 52 | 53 | 54 |
| | 5 | 55 | 56 | 57 | 58 | 59 | 60 | 61 | 62 | 63 | 64 | 65 |
| | 6 | 66 | 67 | 68 | 69 | 70 | 71 | 72 | 73 | 74 | 75 | 76 |
| | 7 | 77 | 78 | 79 | 80 | 81 | 82 | 83 | 84 | 85 | 86 | 87 |
| | 8 | 88 | 89 | 90 | 91 | 92 | 93 | 94 | 95 | 96 | 97 | 98 |

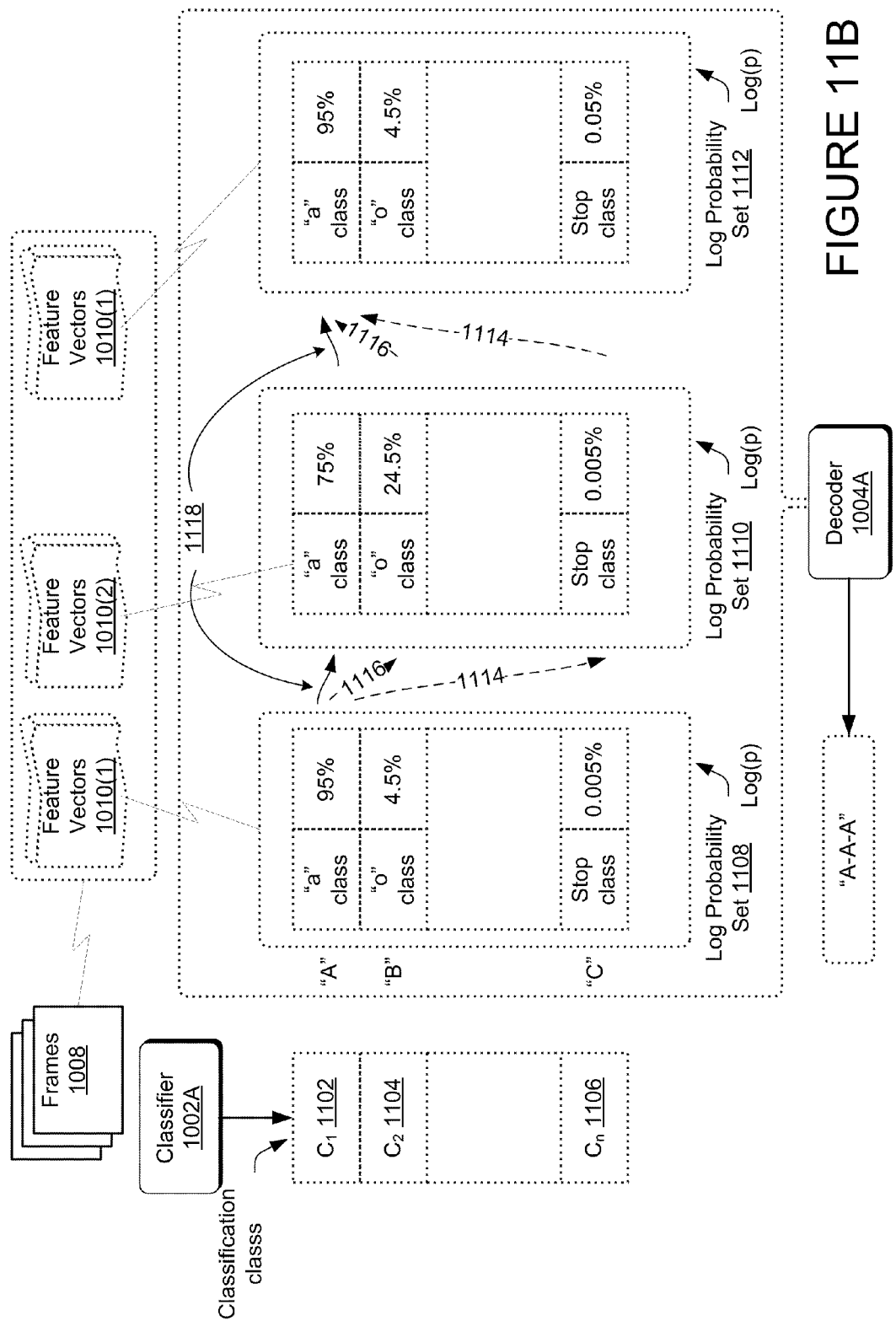

NOISE ROBUST SPEECH CLASSIFIER ENSEMBLE

BACKGROUND

The current generation of speech recognition software generally requires a large amount of processing power and memory footprint. Such speech recognition software may be ill suited for implementation on small portable electronic devices with constrained memory and processing resources. Moreover, current speech recognition software may be susceptible to background noise and interference. Accordingly, the implementation of such speech recognition software on portable electronic devices may result in degradation of speech recognition accuracy, which leads to speech recognition errors and inefficiency. Furthermore, all currently known speech recognition systems are bounded in accuracy by the underlying technology.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for speech recognition using a classifier ensemble for noise robust speech recognition on portable electronic devices. However, the ensemble may also be implemented on a device with more computing resources, such as a server. The various embodiments may include a voice activity detector (VAD) that detects speech input, a noise compensated feature pipeline that transforms the speech into feature vectors, and a speech classifier ensemble that converts the feature vectors into recognizable symbol sequences, so that speech recognition based on the symbol sequences may be performed. The various embodiments may be implemented on small portable electronic devices with constrained memory and processing capabilities, as well as other computing devices.

In at least one embodiment, a speech recognition system includes a classifier ensemble to convert feature vectors that represent a speech vector into log probability sets. The classifier ensemble includes a plurality of classifiers. The speech recognition system also includes a decoder ensemble to transform the log probability sets into output symbol sequences. The speech recognition system further includes a query component to retrieve one or more speech utterances from a speech database using the output symbol sequences.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 5 illustrates an exemplary matrix that holds output coefficients of a set of frames, in accordance with various embodiments.

FIG. 11B illustrates the operations of an exemplary decoder in a decoder ensemble, in accordance with various embodiments.

DETAILED DESCRIPTION

This disclosure is directed to embodiments that enable the transformation of speech data in an input audio signal into a recognizable symbol sequence that may be further processed. For example, but not as a limitation, the processing may include storing the symbol sequence that represents the speech data in a memory. Alternatively, the symbol sequence that represents the speech data may be matched to a pre-stored symbol sequence. Accordingly, the embodiments may enable the retrieval of pre-stored speech data that match the input speech data. The transformation of the speech data into symbol sequences may include the use of a voice activity detector (VAD) that detects speech input, a noise compensated feature pipeline that transforms the speech into feature vectors, and a speech classifier ensemble that converts the feature vectors into recognizable symbol sequences. The embodiments described herein may enable the implementation of a noise-robust speech ensemble on various computing devices, including small portable electronic devices with constrained memory and processing capabilities. Various examples of noise robust speech recognition in accordance with the embodiments are described below with reference to FIGS. 1-16.

Exemplary Scheme

Figure 1:
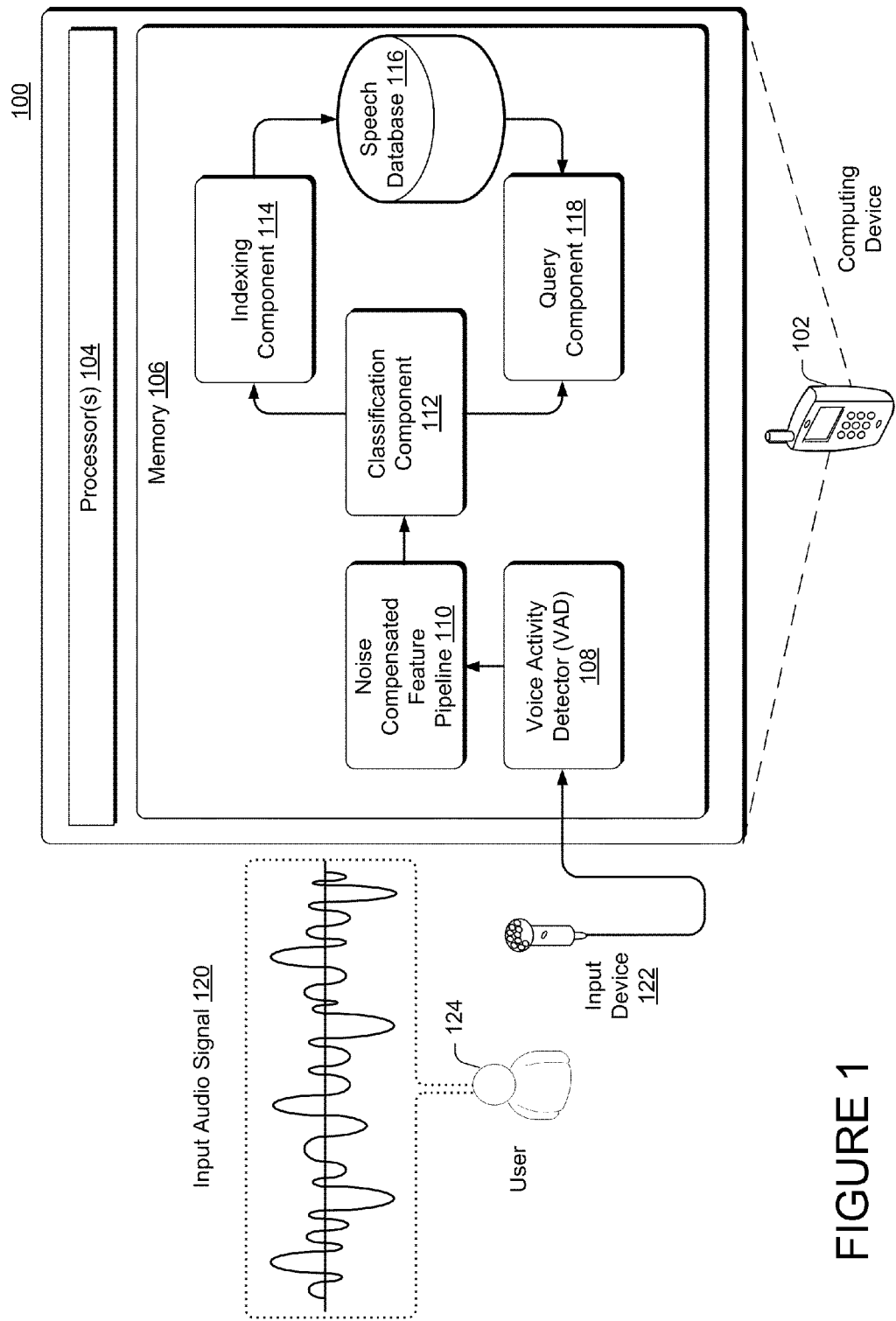
FIG. 1 shows a block diagram that illustrates an exemplary computing environment for implementing at least one embodiment of a noise robust speech classifier ensemble.

FIG. 1 shows a block diagram that illustrates an exemplary computing environment 100 for implementing a noise robust speech classifier ensemble, in accordance with various embodiments. The exemplary computing environment 100 may include a speech recognition-capable device 102. The speech recognition-capable device 102 may include one or more processors 104 and memory 106. The memory 106 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EE-PROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 106 may store program instructions. The program instructions, or modules, may include routines, programs, objects, components, and data structures that cause components of speech recognition-capable device 102 to perform particular tasks or implement particular abstract data types. The selected program instructions may include instructions for a voice activity detector (VAD) 108, a noise compensated feature pipeline 110, a classification component 112, an indexing component 114, a speech database 116, and a query component 118.

The voice activity detector 108 may receive an input audio signal 120 via an input device 122 (e.g., microphone). In various embodiments, the input audio signal 120 may include a speech utterance by a speaker 124. The voice activity detector 108 may isolate the voiced portion (e.g., speech portion) from the unvoiced portion of the input audio signal 120. Unvoiced portion of the input audio signal 120 may be easily corrupted by any kind noise (e.g., background noise, microphone artifacts, system interference, etc.). Accordingly, the isolation of the voiced portion from the unvoiced portion may improve retrieval accuracy under noisy conditions. Otherwise the system may try to match parts of the query to random symbols corresponding to the unvoiced parts.

The voice activity detector 108 may pass the voiced portion of the input audio signal 120 to the noise compensated feature pipeline 110. The noise compensated feature pipeline 110 may transform the voiced portion of the input audio signal 120 into feature vectors, i.e., a representative form of the voiced portion.

Subsequently, the noise compensated feature pipeline 110 may pass the feature vectors to the classification component 112. The classifier ensemble may translate the feature vectors into symbols that represent the original voiced portion. The symbols that represent the voiced portion may be indexed by the indexing component 114 and stored in the speech database 116 along with the original speech data (e.g., electronic recordings of speech utterances). The speech data may also be stored in a data storage that is separate from the speech database 116 provided that the indexes stored in the speech database 116 may be used to access the speech data. It will be appreciated that the speech data may be stored electronically in various audio file formats (e.g., WAV, AIFF, and the like). However, in other instances, symbol sequences corresponding to the speech data may be stored alongside of the speech data itself (instead of separately in an index). For example the symbol sequences may be stored as metadata in a WAV file, AIFF file, etc.

Alternatively, the symbols that represent the voiced portion may be compared by the query component 118 to one or more symbols that are already stored in the speech database 116. In such a scenario, the query component 118 may match the representative symbols to the pre-stored symbols. In this way, the exemplary computing environment 110 may enable the retrieval and manipulation of speech data that is represented by the matching symbols pre-stored in the speech database 116 (e.g., retrieval of the speech data, modification of the speech data, deletion of the speech data, organization of the speech data, presentation of the speech data, and/or the like).

Input Sound Signal Frames

Figure 2:
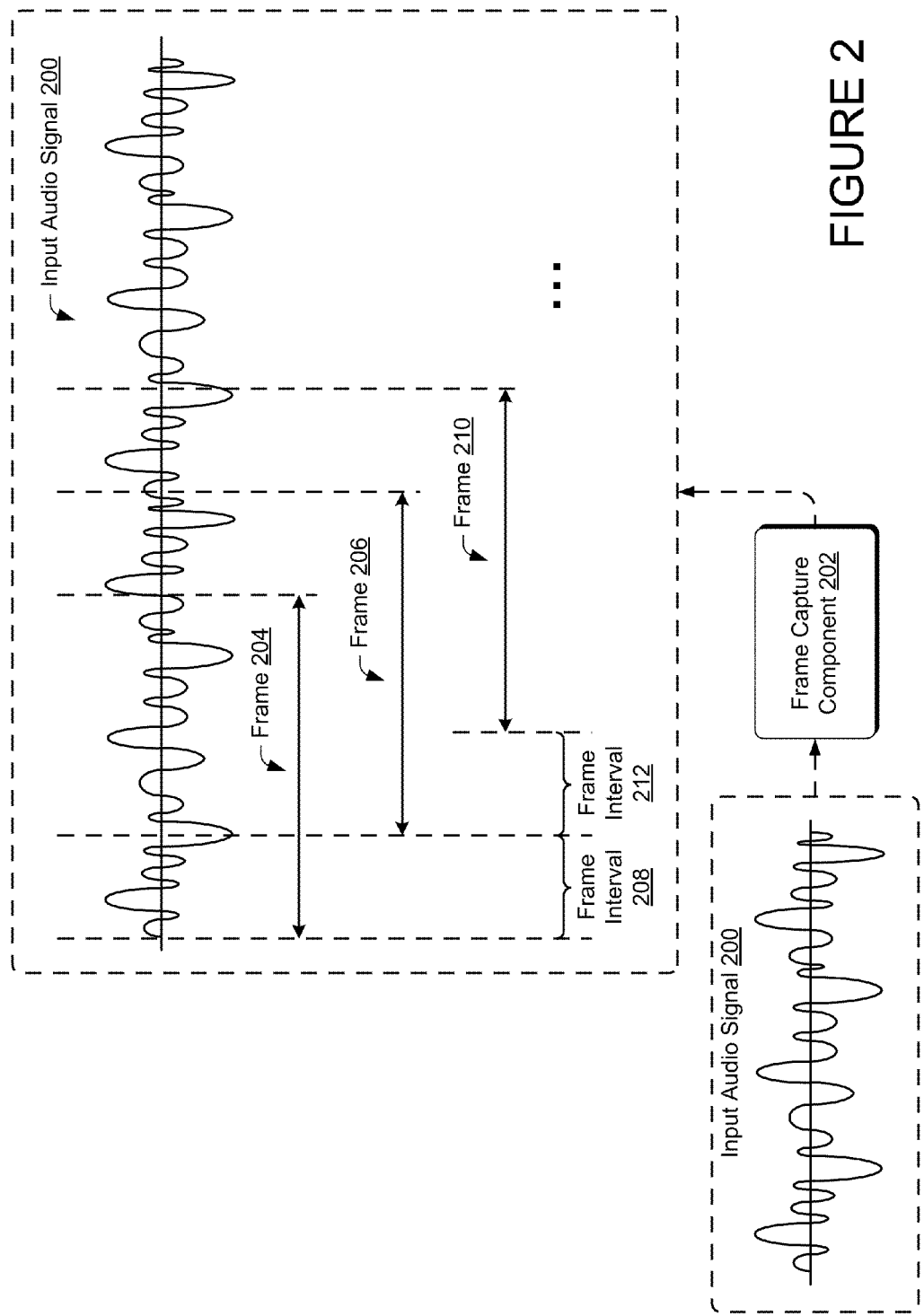
FIG. 2 illustrates the segmentation of an exemplary input sound signal into a plurality of frames by a frame capture component for further processing by a noise robust classifier ensemble, in accordance with various embodiments.

FIG. 2 illustrates the segmentation of an exemplary input sound signal 200 into a plurality of frames by a frame capture component 202 for processing by a noise robust classifier ensemble, in accordance with various embodiments. The frame capture component 202 may pre-process the input audio signal 120 (FIG. 1) prior to the input of the audio signal into the voice activity detector 108 and/or the noise compensated feature pipeline 110. As shown, a frame capture component 202 may digitize the exemplary input sound signal 200 at a predetermined frequency. In at least one embodiment, the feature pipeline component may digitize the input sound signal 200 at a frequency of approximately 8 kHz, that is, the input sound signal 200 is sampled at a rate of 8,000 samples per second. However, in other embodiments, the input sound signal 200 may be sample at other rates.

Following digitization, the frame capture component 202 may capture a frame 204 of the digitized input sound signal 200 such that the frame 204 includes a predetermined number of samples. In at least one embodiment, the frame 204 may include approximately 256 samples. Subsequently, the frame capture component 202 may capture a frame 206 of the digitized input sound signal 200 that includes the same number of samples as the frame 204. However, the frame 206 may be shifted forward in time from the frame 204 at a predetermined frame interval 208. In at least one embodiment, the frame interval may be approximately 80 pulse-code modulation (PCM) samples, which correspond to approximately 10 milliseconds (ms)or an operational frame rate of 100 fps. Further, the frame capture component 202 may capture a frame 210 of the digitized input sound signal 200 that has the same length as the frame 204 and is also shifted from frame 206 by a frame interval 212 that is identical to the frame interval 208 Accordingly, in this fashion, the frame capture component 202 may capture a plurality of shifted frames of the same duration from the digitized input sound signal 200. The frames may be further provided to the voice activity detector 108 and/or the noise compensated feature pipeline 110.

It will be appreciated that while some digitalization frequency, sampling rate, frame length, and frame interval values have been described above in various embodiments, the feature pipeline may digitize the input sound source and capture frames using other such values in other embodiments.

Noise Compensated Feature Pipeline

Figure 3:
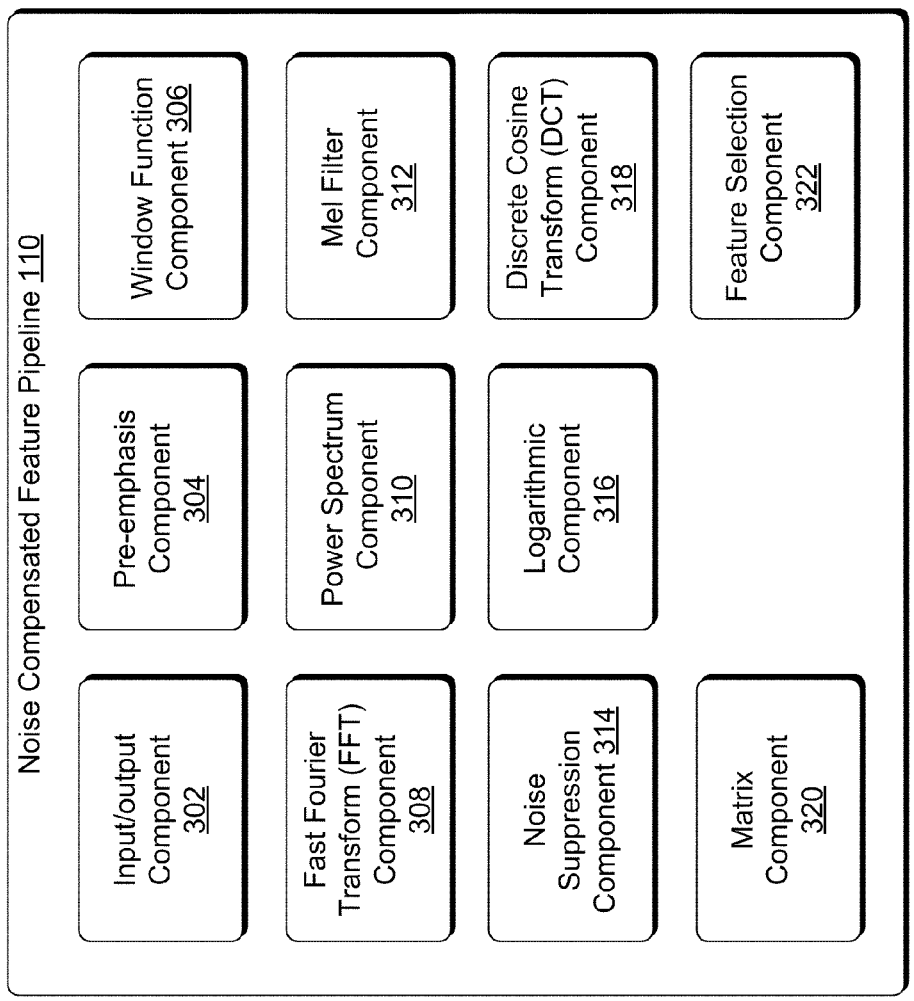
FIG. 3 shows a block diagram that illustrates selected components of an exemplary noise compensated feature pipeline, in accordance with various embodiments.

FIG. 3 shows a block diagram that illustrates selected components of an exemplary noise compensated feature pipeline 110, which was introduced in FIG. 1, in accordance with various embodiments. The selected components of the exemplary noise compensated feature pipeline 110 may include routines, programs, objects, components, and data structures for performing particular tasks or implementing particular abstract data types.

In at least one embodiment, the noise compensated feature pipeline 110 may include an input/output component 302, a pre-emphasis filter component 304, a windows function component 306, a Fast Fourier Transform (FFT) component 308, a power spectrum component 310, a Mel filter component 312, a noise suppression component 314, a logarithmic component 316, a Discrete Cosine Transform component 318, a matrix component 320, and a feature selection component 322. As described below with respect to FIG. 4, the various components may be used to implement a noise compensated feature pipeline.

Figure 4:
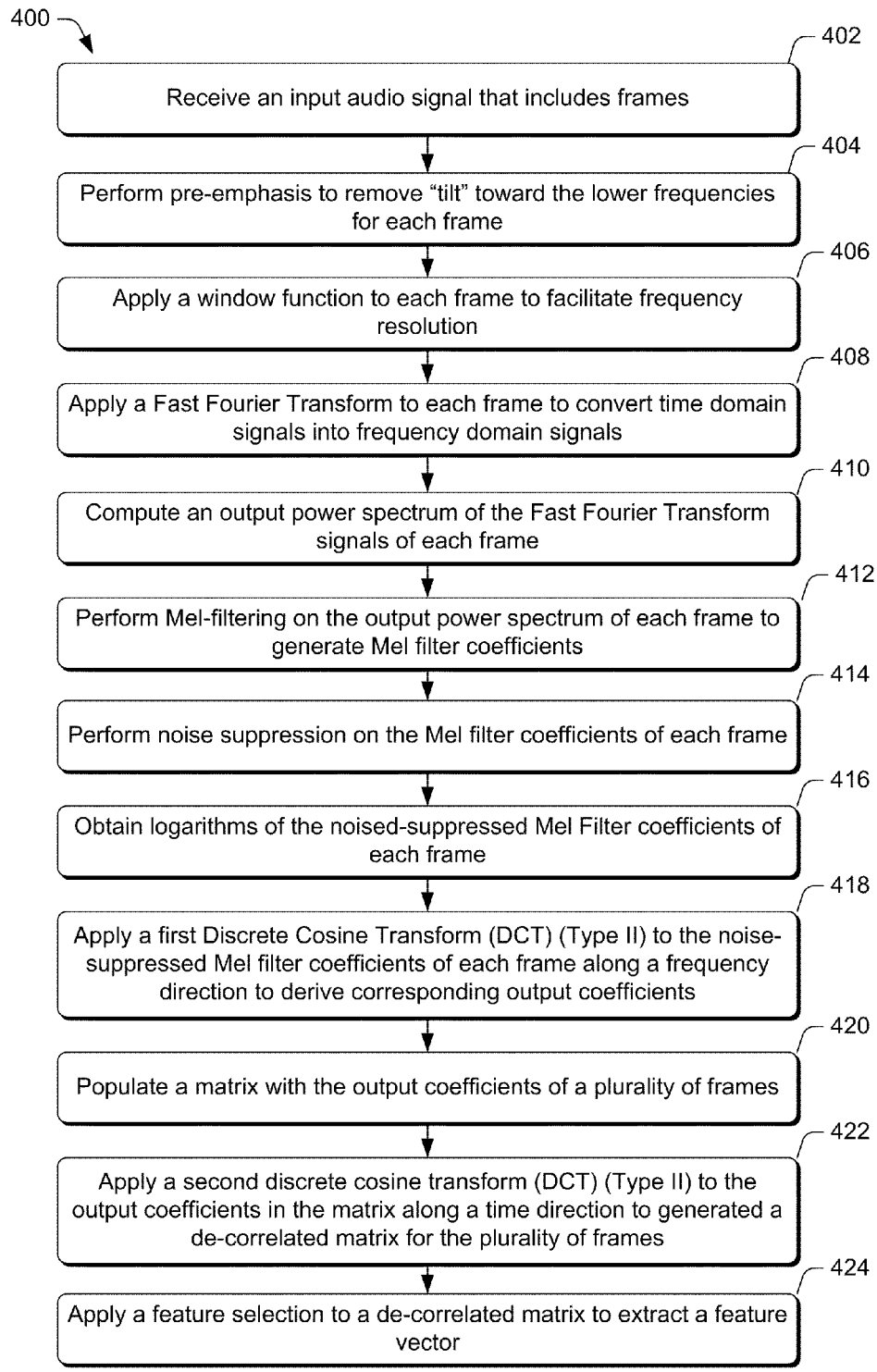
FIG. 4 shows a flow diagram illustrating an exemplary process for implementing a noise compensated feature pipeline, in accordance with various embodiments.

FIG. 4 shows a flow diagram illustrating an exemplary process 400 for implementing a noise compensated feature pipeline, in accordance with various embodiments. FIG. 4 is illustrated as a collection of blocks in a logical flow diagram, which represents a sequence of operations that can be implemented in hardware, software, and a combination thereof. In the context of software, the blocks represent computer-executable instructions that, when executed by one or more processors, cause the one or more processors to perform the recited operations. Generally, computer-executable instructions include routines, programs, objects, components, data structures, and the like that cause the particular functions to be performed or particular abstract data types to be implemented. The order in which the operations are described is not intended to be construed as a limitation, and any number of the described blocks can be combined in any order and/or in parallel to implement the process. For discussion purposes, the processes are described with reference to the exemplary noise compensated feature pipeline 110 of FIG. 1, although it may be implemented in other system architectures.

At block 402, the noise compensated feature pipeline 110 may receive one or more frames of a digitized speech via the input/output module 302, such as the frames described in FIG. 2.

At block 404, the noise compensated feature pipeline 110 may use the pre-emphasis component 304 apply a pre-emphasis filter to the speech data in each frame of the digitized speech. In various embodiments, as described above, each of the one or more frames may include a predetermined number of PCM samples, and each frame may be shifted forward in time from a previous frame by a predetermined time interval. For example, each of the frames may include 256 PCM samples, which correspond to 32 milliseconds. Moreover, each of the fames may be shifted forwarded in time by an 80 PCM sample, or 10 milliseconds.

The pre-emphasis component 304 may be configured to remove the "tilt" towards the lower frequencies of each frame. Accordingly, the frequencies in each frame may be "normalized" so that the high frequency bands in each frame may become more noise-robust. In some embodiments, the pre-emphasis filter may be implemented according to the following pseudo code:

```
for (i = FrameLength - 1; i > 0; ++i)
    Frame[i] = Frame[i] - PreEmphCoeff * Frame[i - 1];
Frame[0] = Frame[0] * (1 - PreEmphCoeff);
``` which may also be expressed in a block-continuous version:

```
BlockContinuousPreEmphasis (int FrameLength, int Nstep,
    float[ ] Frame, ref float xlast, float PreEmphCoeff)
    savelast = Frame[Nstep - 1];
    int n;
    for (i = FrameLength - 1; i > 0; --i)
        Frame[i] -= PreEmphCoeff * Frame[i - 1];
    x[0] -= PreEmphCoeff * xlast;
    xlast = savelast;
```

With respect to the above pseudo code, it will be appreciated that theoretically speaking, Frame[0] may be generally computed as Frame[0]=Frame[0]−PreEmphCoeff*Frame[−1] where Frame[−1] is the last sample of the previous frame—as in the block continuous version. However, in the non-block continuous version, a simple approximation may be used: Frame[−1]=Frame[0]. In at least one embodiment, the value of PreEmphCoeff may be set to approximately 0.97 (this value was determined empirically). However, it will be appreciated that the PreEmphCoeff may be set to other values, provided that that the values are sufficient to remove the "tilt" toward the lower frequencies in each frame.

At block 406, the noise compensated feature pipeline 110 may use the window function component 306 to apply a window function to the speech data in each of the frames. In various embodiments, the window function may be a Hamming window function, a Hanning window function, a Blackman window function, or the like. The window function may serve to control the frequency resolution of a FFT spectrum for each frame that is described below. For example, the feature pipeline component 302 may apply a Hamming window over the 256 PCM samples of a frame using the following pseudo code:

```
for (i = 0; i < FrameLength; ++i)
    Frame[i] = Frame [i] * (0.54 - 0.46 * Cos(2.0f * (float)PI * i /
    (FrameLength - 1))
```

It will be appreciated that the application of the above described pseudo code may be used to facilitate frequency resolution over the rectangular windows.

At block 408, the noise compensated feature pipeline 110 may use the FFT component 308 to apply a FFT to each frame of speech data. The FFT may convert the time domain signals of the speech data into frequency domain signals. Since similar speech utterances have more variation in the time domain, but less variation in the frequency domain, the FFT conversion may enable phonemes or other transient characteristics of speech in similar speech utterances to be compared and matched. In various embodiments, a radix-4 Discrete Fourier Transform (DFT) algorithm may be applied to the frame of speech data. In at least one embodiment, the application of DFT to each frame may be represented by the following equation, where x(n) is the input signal, X(k) is the DFT, and N is the frame size:

$$X(k) = \sum_{n=0}^{N-1} x(n) e^{-j2\pi k n/N} \quad 0 \leq k \leq N-1 \quad (1)$$

At block 410, the noise compensated feature pipeline 110 may use the power spectrum component 310 to compute the output power spectrum of the real and imaginary components of the DFT. In other words, the power spectrum component 310 may compute the squared magnitude of the DFT, as illustrated in the following equation:

$$|X(k)|^2 = X(k)X^*(k) \quad (2)$$

Where * indicates the complex conjugate. This power spectrum computation may reduce by half the number of PCM samples in each frame. For example, in the instance where a frame includes 256 PCM samples, the power spectrum computation may reduce the number of PCM samples into 128 samples.

At block 412, the noise compensated feature pipeline 110 may use the Mel-filter component 312 to perform Mel-filtering on the output power spectrum. In other words, the output power spectrum may be warped according to a Mel-frequency scale, or a similar scale, to model human frequency and pitch resolution capability. In various embodiments, the output power spectrum may be warped using a Mel-scaled triangular filter bank having a predetermined number of bands. Accordingly, the linear-to-Mel frequency transformation using the Mel-scaled triangular filter bank may represented by the following formula, where M is the number of bands in the filter bank, with m ranging from 0 to M−1, and f is in hertz (Hz):

$$Mel(f) = 1127 \ln\left(1 + \frac{f}{700}\right) \quad (3)$$

Additionally, $H_m(k)$ may represent the weight given to the $k^{th}$ energy spectrum bin contributing to the $m^{th}$ output band:

$$H_m(k) = \begin{cases} 0, & k < f(m-1) \text{ or } k > f(m+1) \\ \frac{k - f(m-1)}{f(m) - f(m-1)}, & f(m-1) \le k \le f(m) \\ \frac{(f(m+1) - k)}{f(m+1) - f(m)}, & f(m) \le k \le f(m+1) \end{cases} \quad (4)$$

where f(m) is the center frequency index of $H_m(k)$, which is equally spaced in the Mel-frequency domain:

$$f(m) = Mel^{-1}\left(\frac{k+1}{K+1} \cdot \frac{Fs}{2}\right) \quad (5)$$

As shown, a $Mel^{-1}$ transform is the inverse of Mel, and Fs represents the sampling frequency (e.g., 8000 Hz). Accordingly, $H_m(k)$ may be normalized so that the sum of $H_m(k)$ is equal to one for each k, as follows:

$$H'_m(k) = \frac{H_m k}{\Sigma_k H_m k} \quad (6)$$

In at least one embodiment, the noise compensated feature pipeline 110 may use a 15-band Mel-scaled triangular filter bank on the output power spectrum. However, it will be appreciated that in other embodiments, Mel-scaled triangular filter banks having a different number of bands may be used on the output power spectrum to model human frequency and pitch resolution capability. The filter of the output power spectrum with the Mel-scaled triangular filter bank may produce Mel filter coefficients that correspond to the number of bands in the Mel-scaled triangular filter bank. For example, the use of a 15-band Mel-scaled triangular filter bank on the output power spectrum may produce 15 Mel filter coefficients.

Figure 7:
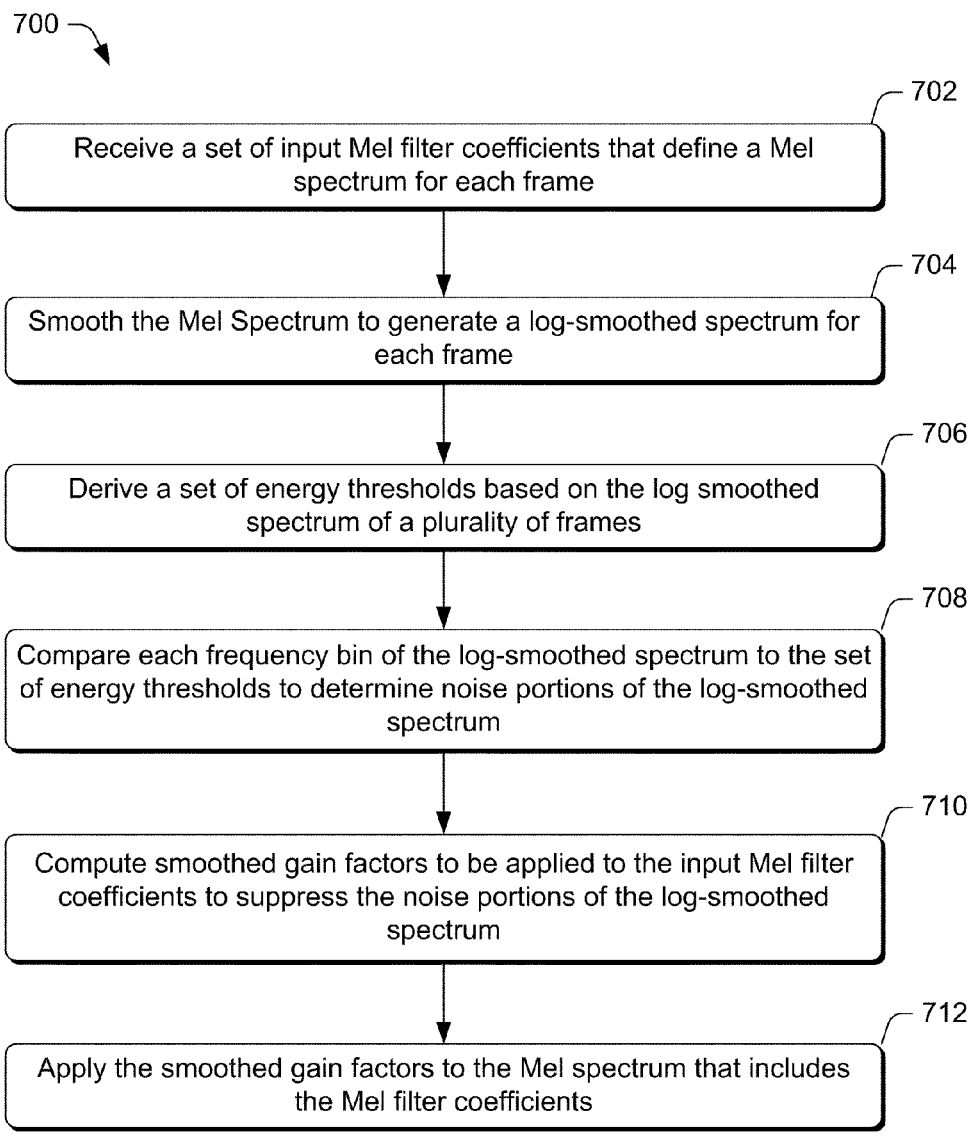
FIG. 7 shows a flow diagram illustrating an exemplary process for implementing a noise-compensation algorithm to a plurality of Mel filter coefficients, in accordance with various embodiments.

At block 414, the noise compensated feature pipeline 110 may use the noise suppression component 314 to provide noise suppression to the Mel filter coefficients. In various embodiments, the noise suppression component 314 may apply a noise compensation algorithm to separate the speech portion and the noise portion of the speech data, as included in the Mel filter coefficients. The application of at least one embodiment of a noise compensation algorithm is illustrated in FIG. 7. It will be appreciated that in other embodiments, noise compensation algorithms other than the algorithm described in relation to FIG. 7, may be applied to provide noise suppression to the Mel filter coefficients.

At block 416, the noise compensated feature pipeline 110 may use the logarithmic component 316 to obtain logarithms of the noise-suppressed Mel filter coefficients. This logarithmic transformation of the noise-suppressed Mel filter coefficients may serve to account for human sensitivity and/or perception to the amplitude of sound data in each frame.

At block 418, the noise compensated feature pipeline 110 may use the DCT component 318 to apply a first 1-dimensional (1-D) discrete cosine transform (DCT)(Type II) to the noise suppressed Mel filter coefficients. The purpose of this operation is to de-correlate across the frequencies, that is, along a frequency dimension, and pack the information from the Mel filter coefficients into a smaller set of coefficients. Accordingly, the operation may enhance space/time efficiency by generating less data for subsequent processing. For example, the noise compensated feature pipeline 110 may generate 11 output coefficients from an input of 15 Mel filter coefficients. However, it will be appreciated that in other embodiments, other coefficient sets having different numbers of output coefficients may be generated as long as the number of output coefficients is less than the number of input Mel filter coefficients.

At block 420, the matrix component 320 may populate the sets of output coefficients of each frame in a set of frames into a matrix. In at least one embodiment, the matrix may include a frequency dimension and a time dimension. The set of frames may include a frame and a number of frames that immediately precedes the frame. For example, when the noise compensated feature pipeline 110 has generated 11 output coefficients for a frame, the matrix component 320 may use the 11 output coefficients of the frame, as well as the 11 output coefficients from each of the immediately preceding 8 frames to form an 11×9 matrix, as shown in FIG. 5.

FIG. 5 illustrates an exemplary matrix 500 that holds output coefficients of a set of frames, in accordance with various embodiments. The exemplary matrix 500 may be populated by the matrix component 320. As shown, the exemplary 11×9 matrix may include a frequency dimension 502, and a time dimension 504. Row 506 (time 5) of the matrix 500 includes the 11 output coefficient of a particular frame, or frame t. Moreover, row 508 (time index 7) includes the 11 output coefficients of a frame immediately preceding the particular frame, or frame t−1. Likewise, row 510 (time index 6) includes the 11 output coefficients of a frame t−2, and so on and so forth, up to a total of 9 frames.

Return to FIG. 4, at block 422, the noise compensated feature pipeline 110 may use the DCT component 318 to apply a second 1-D DCT (Type II) to the coefficients of the matrix obtained at block 420 to generate 2-D DCT coefficients. In various embodiments, the second 1-D DCT may be applied along the time direction to de-correlate each coefficient value of the matrix over the same number of frames as in block 420 (e.g., 9 frames).

At block 424, the noise compensated feature pipeline 110 may use a feature selection mask of the feature selection component 322 to extract the feature vector from the decorrelated matrix of the block 422. For example, the feature selection mask may be applied to a de-correlated 11×9 matrix. In such an example, the feature selection mask may provide a selection of 30 coefficient outputs that may have the highest variance, as show below, where the mask may refer to the reference index of the 11×9 matrix illustrated in FIG. 5:

```
FeatureSelectionMask =
{
    1, 2, 3, 4, 5, 6, 7, 8, 9, 10,
    11, 12, 13, 14, 15, 16, 17, 18, 19,
    22, 23, 24, 25, 26, 27,
    33, 34,
    44,
    55,
    66
};
```

It will be appreciated that the feature selection mask may ignore the zero-th 2D-DCT output coefficient, as it is the mean value, and generally does not carry sufficient information for classification purposes. In various embodiments, ignoring the zero-th value may enable power normalization to be implemented with less processing power.

The feature selection mask described above was obtained based on the heuristic of maximum energy. In other words, the output coefficients of the feature selection mask were selected because they empirically carry the most energy. However, in other embodiments, feature selection masks with other heuristics (e.g., maximum entropy) may be used to select the feature vector for each frame, as long as the resultant feature vector is amplitude invariant.

Figure 6:
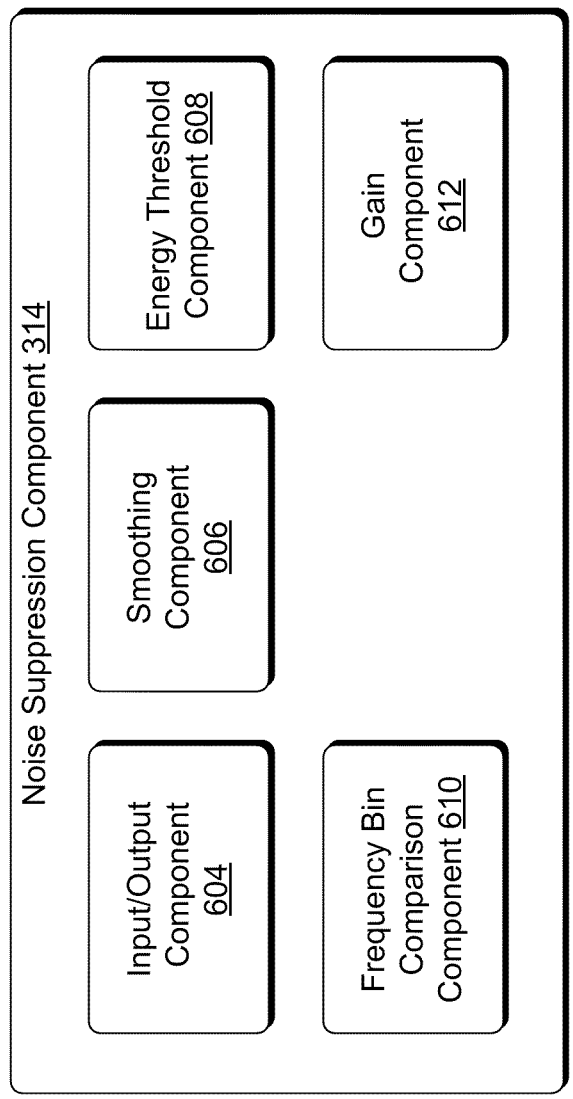
FIG. 6 shows a block diagram that illustrates selected components of an exemplary noise suppression component, in accordance with various embodiments.

FIG. 6 shows a block diagram that illustrates selected components of an exemplary noise suppression component 314, in accordance with various embodiments. The selected components may include routines, programs, objects, components, and data structures for performing particular tasks or implementing particular abstract data types.

In at least one embodiment, the noise suppression component 314 may include an input/output component 604, a smoothing component 606, an energy threshold component 608, a frequency bin comparison component 610, and a gain component 612. As described below with respect to FIG. 7, the various components may be used to apply a noise-compensation algorithm to a plurality of Mel filter coefficients.

FIG. 7 shows a flow diagram illustrating an exemplary process 700 for implementing a noise-compensation algorithm to a plurality of Mel filter coefficients, in accordance with various embodiments. Process 700 may further illustrate block 414 of the Process 400, described above with regard to FIG. 4. FIG. 7 is illustrated as a collection of blocks in a logical flow diagram, which represents a sequence of operations that can be implemented in hardware, software, and a combination thereof. In the context of software, the blocks represent computer-executable instructions that, when executed by one or more processors, cause the one or more processors to perform the recited operations. Generally, computer-executable instructions include routines, programs, objects, components, data structures, and the like that cause the particular functions to be performed or particular abstract data types to be implemented. The order in which the operations are described is not intended to be construed as a limitation, and any number of the described blocks can be combined in any order and/or in parallel to implement the process.

At block 702, the noise suppression component 314 may use an input/output component 604 to receive a set of input Mel filter coefficients for each frame. For example, the noise suppression component 314 may receive a set of 15 Mel coefficients. The input Mel filter coefficients may define a Mel spectrum in a 2-dimensional space that includes a time domain and a frequency domain.

At block 704, the Mel spectrum defined by the input Mel filter coefficients may be smoothed by the smoothing component 606 of the noise suppression component 314. The smoothing of the Mel spectrum may suppress noise spikes that may bias the noise suppression component 314. In various embodiments, given that S(t, m) is the m-th Mel filter coefficient at time t, the smooth component 606 may first smooth the Mel spectrum defined by the Mel filter coefficients in the frequency direction, as follows:

$$S'(t, m) = \frac{1}{2L' + 1} \sum_{k=k-L'}^{k+L'} s(t, k) \quad (7)$$

where L' is the length of the smooth window. In at least one embodiment, L' may be set equal to 1. Second, the frequency directional smoothing may be followed by time directional smoothing, as follows:

$$S''(t,m) = \alpha S''(t-1,m) + (1-\alpha)S'(t,m) \quad (8)$$

where α is a parameter to control the smoothness. In at least one embodiment, a may be set to 0.45, although α may be set to other values in other embodiments. Subsequently, the log of smoothed spectrum may be obtained to compute the log-smoothed spectrum, as follows:

$$S_{log}(t,m) = \log(S''(t,m)) \quad (9)$$

At block 706, the noise suppression component 314 may use an energy threshold component 608 to derive a set of energy thresholds based on the log-smoothed spectrum of a plurality of frames. In various embodiments, the threshold component 608 may first compute a frame energy of each frame from its log-smoothed spectrum, as follows:

$$E(t) = \Sigma_{m=1}^{M-1} S''(t,m) \quad (10)$$

Moreover, the threshold component 608 may track the highest and the lowest frame energies in a predetermined period of time t. In at least one embodiment, t may be set at 2 seconds, although a may be set to other values in other embodiments. Based on the ratio of the highest and the lowest frame energies in the predetermined period of time t, the threshold component 608 may derive a set of energy thresholds. As further described below, the set of energy thresholds may enable the noise suppression component 314 to derive a noise log-spectrum for each frame from the log smoothed spectrum of the frame.

At block 708, the log-smoothed spectrum may be divided into a plurality of frequency bins, or components, by which each bin may be represented by m. The division of the log-smoothed spectrum may be performed by the frequency bin comparison component 610. The portion of the log-smoothed spectrum included in each frequency bin may be compared to the set of energy thresholds. Based on the comparison, the noise log-spectrum may be unchanged, updated, or reset.

In various embodiments, the portions of the noise log-spectrum in each of the frequency bins may be reset within the log smoothed spectrum, $S_{log}$(t,m) m), if the energy of the current frame, E(t), is very low. For bins with energy levels in the medium range, the update of the noise log-spectrum in each bin may be made on a per-bin basis based on a simple hang-over scheme. For bins with high energy levels, the noise suppression component 314 may maintain the current noise log-spectrum portion.

Accordingly, the noise log-spectrum may be represented as a mean and a variance, $N_{mean}(t,m)$ and $N_{var}(t,m)$, respectively. In the reset case, $N_{mean}(t,m)$ may be set to $S_{log}(t,m)$ and the variance may be computed in the next frame by $(S''(t,m)-N_{mean}(t,m))^2$. To update the mean/variance of the noise log-spectrum, a smoothing filter as follows may be used:

$$N_{mean}(t,m)=\beta_{mean}N_{mean}(t-1,m)+(1-\beta_{mean})S_{log}(t,m) \quad (11)$$

$$N_{var}(t,m)=\beta_{var}N_{var}(t-1,m)+(1-\beta_{var})S_{log}(t,m) \quad (12)$$

whereby the parameters $\beta_{mean}$ and $\beta_{var}$ are adaptive. Further, bumps in the mean/variance may be suppressed across the frequency bins.

In other words, if a current log smoothed spectrum portion in a frequency bin is high enough from a corresponding noise log-spectrum portion, the noise suppression component 314 may decide that the log smoothed spectrum portion is indicative of speech. However, any portion of the log smoothed spectrum in a frequency bin that is under the noise log-spectrum may become a new candidate for the noise log-spectrum (the noise spectrum is always the lowest energy candidate).

At block 710, the noise suppression component 314 may use the gain component 612 to compute gain factors to be applied to the Mel filter coefficients. The gain factors may facilitate the suppression of the noise component of each frame, as represented by the noise log-spectrum, from the speech component of each frame, as represented by the log-smoothed spectrum. In various embodiments, the noise suppression component 314 may be applied on a frequency bin-by-frequency bin basis. The gain factor may be calculated based on the signal-to-noise ratio between the speech and the noise included in each frame.

Accordingly, the signal-to-noise ratio (SNR) at each frequency bin may be computed as:

$$SNR(t, m) = \frac{s''(t \cdot m)}{\exp(N_{mean}(t, m))} \quad (13)$$

Subsequently, the gain component 612 may convert the obtained SNRs to gain factors that may be smoothed and multiplied with the input Mel spectrum that includes the Mel filter coefficients. In various embodiments, the SNRs may be converted to gain factors as follows:

$$G(t, m) = \begin{cases} \sqrt{1 - \frac{1}{SNR(t,m)}}, & SNR(t,m) > 0 \\ G_{min}, & \text{otherwise} \end{cases} \quad (14)$$

In other words, a low SNR indicates a higher need for noise suppression. Conversely, a high SNR indicates a lesser need for noise suppression. Moreover, the computed gain factors may be smooth with low-pass filtering, as follows:

$$G'(t,m)=\gamma G'(t-1,m)+(1-\gamma)G(t,m) \quad (15)$$

At block 712, the smoothed gain factors may be applied to the input Mel spectrum that includes the Mel filter coefficients, as follows:

$$S_{clean}(t,m)=G'(t,m)S(t,m) \quad (16)$$

Voice Activity Detector

Figure 8:
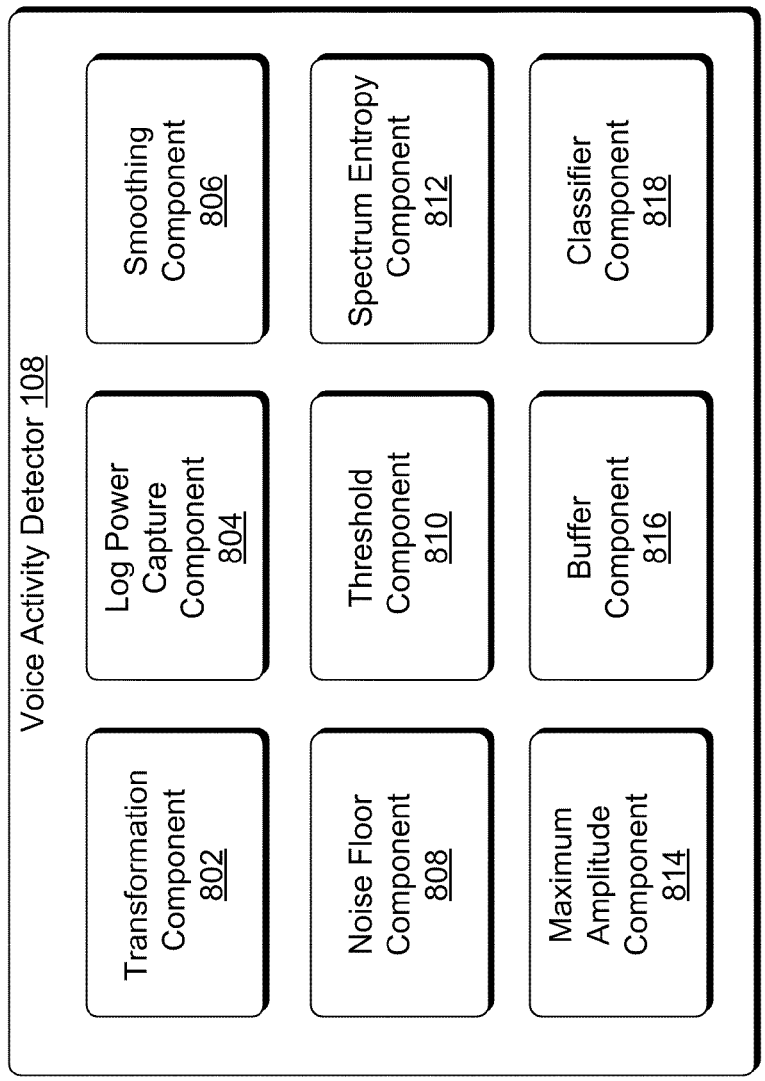
FIG. 8 shows a block diagram that illustrates selected components of an exemplary voice activity detector, in accordance with various embodiments.

FIG. 8 shows a block diagram that illustrates selected components of an exemplary voice activity detector 108, in accordance with various embodiments. The selected components may include routines, programs, objects, components, and data structures for performing particular tasks or implementing particular abstract data types.

In at least one embodiment, the voice activity detector 108 may include a transformation component 802, a log power capture component 804, a smoothing component 806, a noise floor component 808, a threshold component 810, a spectrum entropy 812, a maximum amplitude component 814, a buffer component 816, and a classifier component 818. As described below with respect to FIG. 9, the various components may be used to isolate the voiced portions (e.g., speech portions) from the unvoiced portions of input audio signal.

Figure 9:
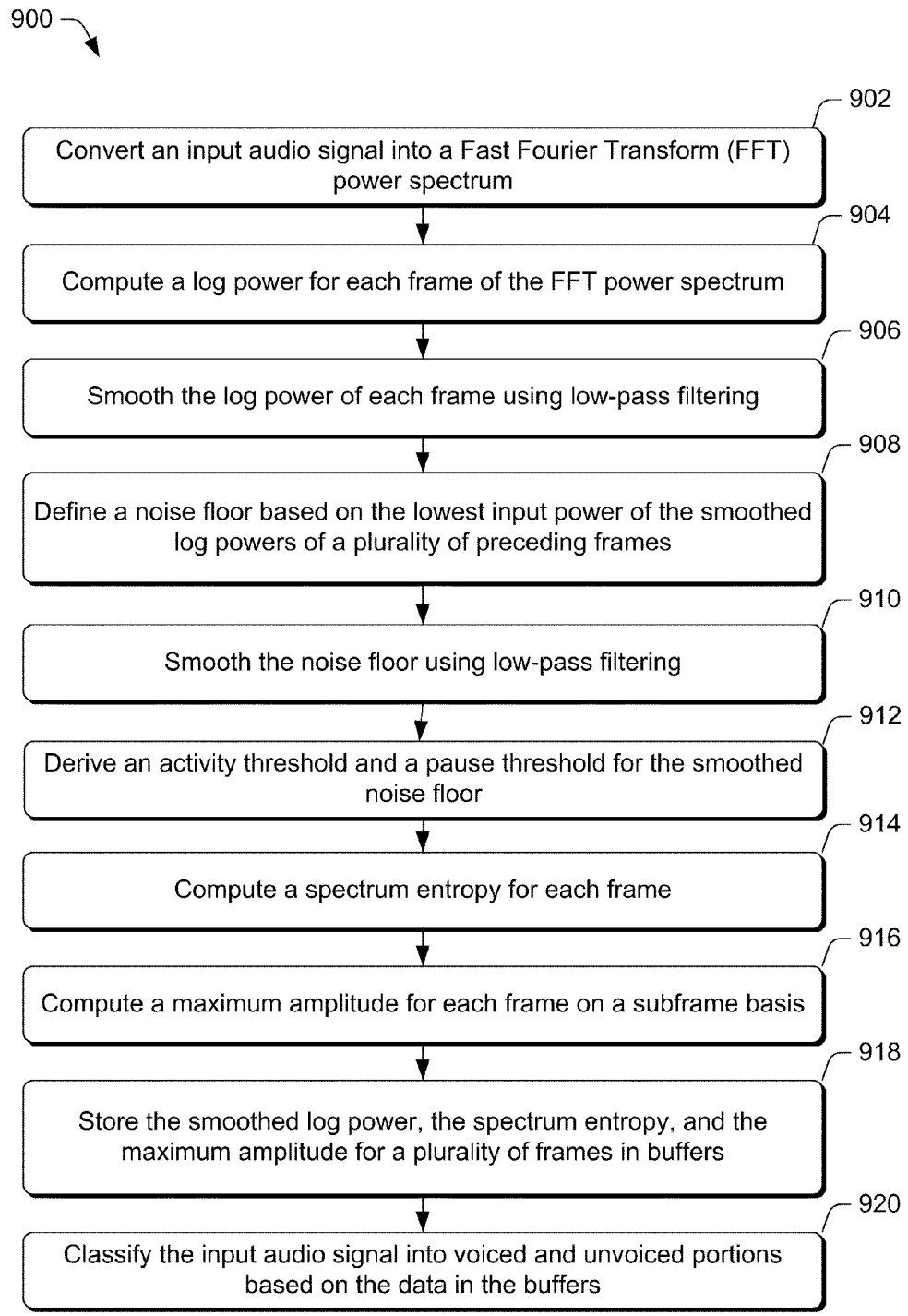
FIG. 9 shows a flow diagram illustrating an exemplary process for implementing a voice activity detector (VAD), in accordance with various embodiments.

FIG. 9 shows a flow diagram illustrating an exemplary process 900 for implementing a voice activity detector (VAD) 108, in accordance with various embodiments. FIG. 9 is illustrated as a collection of blocks in a logical flow diagram, which represents a sequence of operations that can be implemented in hardware, software, and a combination thereof. In the context of software, the blocks represent computer-executable instructions that, when executed by one or more processors, cause the one or more processors to perform the recited operations. Generally, computer-executable instructions include routines, programs, objects, components, data structures, and the like that cause the particular functions to be performed or particular abstract data types to be implemented. The order in which the operations are described is not intended to be construed as a limitation, and any number of the described blocks can be combined in any order and/or in parallel to implement the process. For discussion purposes, the processes are described with reference to the voice activity detector 108 of FIG. 1, although it may be implemented in other system architectures.

The role of voice activity detector 108 is to isolate the voiced portions (e.g., speech portions) from the unvoiced portions of input audio signal. Unvoiced portions of the input audio signal may easily corrupted by any kind noise (e.g., background noise, microphone artifacts, system interference, etc.). Accordingly, the isolation of the voiced portions from the unvoiced portions may improve retrieval accuracy under noisy conditions. Moreover, the isolation of the voiced portions may help to reduce the computational complexity and memory space need to process the speech in the input audio signal (e.g., speech pattern matching and/or recognition). For example, it has been estimated that 20% of normal human speech is actually unvoiced (e.g., pauses between words, phrases, sentences, etc.). Thus, reducing such unvoiced portions may reduce the resources needed for speech processing.

In operation, voice activity detector 108 may use several factors to isolate the voiced portions from the unvoiced portions of the input audio signal. In various embodiments, the voice activity detector 108 may monitor the power of the input audio signal, as present in a frame of the input audio signal, and compare the power with one or more thresholds to determine if the frame contains a voiced portion or an unvoiced portion of the input audio signal.

In addition, the voice activity detector 108 may analyze the spectrum entropy of the input audio signal in each frame to detect voiced portions of the input audio signal. For example, voiced portions of the audio signal generally have high amounts of entropy, while noise portions of the audio signal generally have low amounts of entropy, or variability.

Furthermore, the voice activity detector 108 may also analyze the maximum amplitude of the input audio signal in each frame to improve voiced portion detection and isolation. In some embodiments, the maximum amplitude of the input audio signal are analyzed on a subframe basis, that is, by dividing each frame into a plurality of subframes and performing the maximum amplitude analysis on the subframes. In this way, maximum amplitudes may be computed multiple times per frame to prevent the VAD algorithm form misidentifying medium energy and/or high-energy noise spikes as voiced portions of the input audio signal.

To increase the reliability of voiced portion identification, the VAD algorithm may further use delayed analysis. In delayed analysis, the VAD algorithm may perform its analysis on the audio data of a frame in conjunction with audio data in N future frames. In at least one embodiment, N may be equal to 16 future frames. In other words, for the current processed frame at time t, the VAD algorithm may perform its analysis for the frame at time (t–N), i.e., the analysis is delayed by N frames.

Accordingly, process 900 may be initiated at block 902, at which the voice activity detector 108 may take an input audio signal, as captured in a plurality of frames, and convert the audio signal in each frame into a Fast Fourier Transform (FFT) power spectrum. This transformation may be accomplished by the transformation component 802 of the voice activity detector 108. In various embodiments, the voice activity detector 108 may perform the conversion of the audio signal in each frame in the same manner as described in blocks 302-308 of FIG. 3. In at least some embodiments, the transformation component 802 may include components that are substantially similar to the components 302-308 of the noise compensated feature pipeline 110. In alternative embodiments, transformation component 802 may share the components 302-308 with the noise compensated feature pipeline 110.

At block 904, the voice activity detector 108 may use the log power capture component 804 to compute a frame log power for each frame. In various embodiments, given a power spectrum $|X(t,k)|^2$, the frame log power may be computed at each of the t-th frames:

$$P(t) = \log_2(\Sigma_{k=I_{min}}^{I_{max}} |X(t,k)|^2) \quad (17)$$

in which $I_{min}$ and $I_{max}$ are the respective indices of the start and end frequencies for the power computation.

At block 906, the voice activity detector 108 may use the smoothing component 806 to smooth the log power for each frame using the following low-pass filtering:

$$\tilde{P}(t) = \alpha_p P(t) + (1-\alpha_p)\tilde{P}(t-1) \quad (18)$$

At block 908, the voice activity detector 108 may use the noise floor component 808 to define a noise floor based on the lowest input power in a plurality of preceding seconds, corresponding to t–N frames:

$$N(t) = \min(P(t), N(t-1)) \quad (19)$$

The noise floor may be updated with the last input power in the plurality of preceding intervals (e.g., seconds) that correspond to T frames:

$$N(t) = \min_{t'-1}{}^{t-T}(P(t')) \quad (20)$$

At block 910, the voice activity detector 108 may use the smoothing component 806 to smooth the noise floor using the following low-pass filter:

$$\tilde{N}(t) = \alpha_N N(t) + (1-\alpha_N)\tilde{N}(t-1) \quad (21)$$

At block 912, the voice activity detector 108 may use the threshold component 810 to derive two thresholds, which include an activity threshold, Ta(t), and a pause threshold, Tp(t), from the smoothed noise floor:

$$Ta(t) = Ta(t-1) + Ga + \beta_a(\max(\tilde{N}(t), \tilde{N}_{min}) - \tilde{N}_{min}) \quad (22)$$

$$Tp(t) = Tp(t-1) + Gp + \beta_p(\max(\tilde{N}(t), \tilde{N}_{min}) - \tilde{N}_{min}) \quad (23)$$

in which Ga/Gp represents the offsets to the smoothed noise floor.

At block 914, the voice activity detector 108 may use the spectrum entropy component 812 to determine an additive noise level to the power spectrum to calculate a spectrum entropy for each frame, as follows:

$$En(t) = 2^{\tilde{N}(t)+E_0} \quad (24)$$

in which $E_0$ represents the boosting factor. The total power of the spectrum and noise may be represented as:

$$\overline{E}(t) = \Sigma_{k=F_L}^{F_H}(|X(t,k)|^2 + En(t)) \quad (25)$$

Accordingly, the spectrum entropy may be calculated as follows:

$$E(t) = 1 - \frac{\sum_{k=F_L}^{F_H} Ep(k)\log_2(Ep(k))}{\log(F_L - F_H)}, \quad (26)$$

$$Ep(k) = \frac{|X(t,k)|^2 + En(t)}{\overline{E}(t)}$$

In general, the entropy E(t) is high in frames having voiced portions of the input audio signal due to harmonic (peak) structures and low in the frames having an unvoiced portion of the input voice signal due to flat spectrum. The additive noise level En(t) may improve separation between voiced and unvoiced portions.

At block 916, the voice activity detector 108 may use the maximum amplitude component 814 to compute the maximum amplitude on a subframe basis. The maximum amplitude may distinguish noise spikes from the onset of speech. The maximum amplitude of the subframes may be defined as:

$$A(t,m) = \max_{i=m*L_s}^{(m+1)*L_s-1} \log_2|s(t,i)|, m=0 \ldots M-1 \quad (27)$$

in which M represents the number of the subframes per frame.

At block 918, the voice activity detector 108 may use the buffer component 816 to store the smoothed log power, the spectrum entropy, and the maximum amplitude in a buffer for delayed analysis, as follows:

$$\tilde{P}_{buf} = [\tilde{P}(t-N), \tilde{P}(t-N+1), \ldots, \tilde{P}(t)] \quad (28)$$

$$E_{buf} = [E(t-N), E(t-N+1), \ldots, E(t)] \quad (29)$$

$$A_{buf} = [A(t-N,0), \ldots, A(t-N,M-1), A(t-N+1,0) \ldots, A(t,0), \ldots, A(t,M-1),] \quad (30)$$

In addition, the buffer component 816 may create another buffer for a power L(t) mapped from the smoothed log power:

$$L_{buf} = [L(t-N), L(t-N+1), \ldots, L(t)] \quad (31)$$

in which:

$$L(t) = \begin{cases} 2, & \text{if } \tilde{P}(t) \geq Ta(t) \\ 1, & \text{else if } \tilde{P}(t) \geq Tp(t) \\ 0, & \text{otherwise} \end{cases} \quad (32)$$

At block 920, the voice activity detector 108 may use the classification component 818 to classify the input audio signal into voiced portions and unvoiced portions based on the smoothed log power, the spectrum entropy, the power mapped from the smooth logged power, and the maximum amplitude stored in the buffers using delayed analysis. In this way, the voice activity detector 108 may prepare the input audio signal for further processing by the noise compensated feature pipeline 108. In at least one embodiment, the VAD algorithm may perform the classification using the following pseudo code:

```
State checkStateTransitionFromUnvoiced( )
{
    state = Unvoiced
    count = # of entries in L_buf whose value is zero
    // find the index where the next voiced would start
    for(int i=N; i>0; i--)
        if(L_buf[i]<2){
            indexNextActivityStart = i+1
            break
        }
    // find the index where the current voiced would end
    for(int i=1; i<=N; i++)
        if(L_buf[i]==0){
            indexCurrActivityEnd = i-1
            break
        }
    if(L_buf[0]==2){ // high power frame
        if(count==0) {
            state=Voiced // no low level frames observed
        } else if (indexCurrActivityEnd >= N/4){
            // current voiced seems to continue reasonably long
            // find max and its position from near future
            sampleNearSampleMax = max of A_buf from 0 to 4*M
            indexNearSampleMax = arg max of A_buf from 0 to 4*M
            // find position amplitude drop toward future
            indexSampleDropFar = index where energy drop
                "A_buf[i]<sampleNearMax-2.0" happens from
                indexNearSampleMax+1 to the end of
buffer
            // find position amplitude drop toward past
            indexSampleDropNear = index where energy drop
                "A_buf[i]<sampleNearMax-2.0" happens from
                indexNearSampleMax-1 to the beginning
            if (indexSampleDropFar - indexNearSampleMax >= 5*M ||
                indexNearSampleMax - indexSampleDropNear >= 2*M){
                // it doesn't look like spiky noise
                State=Voiced
            } else if (indexSampleDropFar - indexNearSampleMax >=
3*M){
                // high power region seems reasonably long
                // find max smoothed power over next few frames
                powerSmoothedNearMax = max of P~_buf from first
4 frms
                // find max smoothed power/entropy from far
frames
                powerSmoothedFarMax = max of P~_buf from last 2
frms
                entropySpectrumFarMax = max of E_buf from last 2
frms
                if (powerSmoothedFaxMax >=
powerSmoothedNearMax-7 &&
                    entropySpectrumFaxMax >= 0.1f){
                    // power of far frame is not reduced much,
                    // and its entropy is relatively high
                    state=Voiced
                }
            }
        } else if (indexNextActivityStart <= N*3/4) {
            // next voiced frame would start soon
            // compute average entropy from current active frames
            entropyCurrAvg = Average of E_buf from 0 to
indexCurrActiveEnd
            // compute average entropy from future active frames
            entropyNextAvg = Average of E_buf from
indexNextActivityStart
                to the end
            if (entropyCurrAvg >= 0.2f || entropyNextAvg >= 0.2f){
                // high entropy is observed
                state=Voiced
            }
        }
```

```
    } else if(L_buf[0]==1){ // mid power
        if (count==0 && indexNextActivityStart <= N/4){
            // no low power frame & next high power frame coming
soon
            state=Voiced
        }
    }
    if(state==Voiced)
        countActivityTail=-1 // disable grace period
    return state;
}
State CheckStateTransitionFromVoiced( )
{
    state = Voiced
    If(L_buf[0]==0){ // low power
        if (countActivityTail == 0){ // grace period ends
            state = Unvoiced
        } else if(countActivityTail < 0){ // start grace period
            countActivityTail=N_G
        }
        countActivityTail--
    }else{
        countActivityTail=-1 // disable grace period
    }
    return state;
}
```

Classification Component

Figure 10:
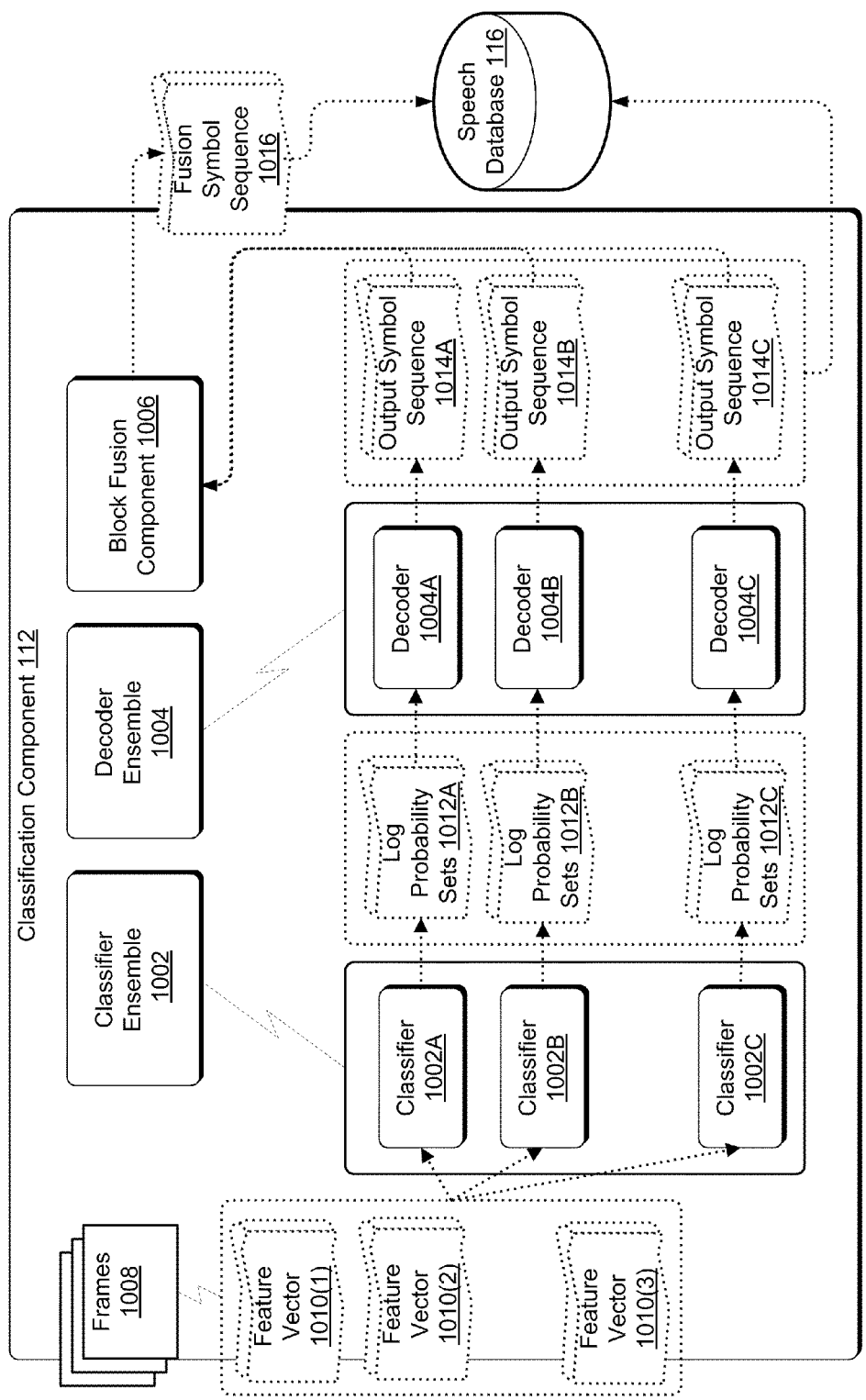
FIG. 10 shows a block diagram that illustrates selected components of an exemplary classification component, in accordance with various embodiments.

FIG. 10 shows a block diagram that illustrates selected components of an exemplary classification component 112 (FIG. 1), in accordance with various embodiments of a noise robust speech classifier ensemble. The classification component 112 may include a classifier ensemble 1002, a decoder ensemble 1004, and a block fusion component 1006.

The classifier ensemble 1002 may convert feature vectors into corresponding log probability vectors. For example, the noise suppression feature pipeline 110 (FIG. 1) may generate a plurality of feature vectors 1010 (e.g., feature vectors 1010(1)-1010(3) from a plurality corresponding frames 1008.

As shown, the classification component 112 may apply a plurality of classifiers (e.g., classifiers 1002A, 1002B, and 1002C) of a classifier ensemble 1002 to each feature vector (e.g., feature vector 1010(1)). As further described below, the classifier ensemble 1002 may include various types of classifiers, such as, but not limited to, Hidden Markov Model (HMM) classifiers, Gaussian Mixture Model (GMM) classifiers, Multi-level Preceptron (MLP) classifiers, or a combination of one or more different types of classifiers. In some embodiments, the classifier ensemble 1002 may additionally include supervised classifiers and/or unsupervised classifiers. In various embodiments, each classifier of the classifier ensemble 1002 may transform the feature vector from each of the frames 1008 into a plurality of log probability sets.

For example, the classification component 112 may apply the classifier ensemble 1002 that includes the classifiers 1002A, 1002B, and 1002C sequentially to the feature vector sets 1010(1)-1010(3). Accordingly, classifier 1002A may produce log probability sets 1012A from the feature vector sets 1010(1)-1010(3). Likewise, classifier 1002B may produce log probability set 1012B from the same feature vector sets 1010(1)-1010(3), and classifier 1002C may produce a set of log probability vectors 1012C from the same feature vector sets 1010(1)-1010(3).

The decoder ensemble 1104 may include decoders that correspond to the classifiers in the classifier ensemble 1002. The decoders may transform the log probability sets that are outputted by the classifiers into corresponding sets of output symbol sequences, in which each output symbol sequence is a form of representation for the speech that is originally embodied in the frames 1008. In various embodiments, each of the decoders may be a Viterbi decoder that takes in the log probability sets from each classifier to produce the output symbol sequence. For example, the decoder 1004A may produce output symbol sequence 1014A from the log probability set 1012A. Likewise, the decoder 1004B may produce output symbol sequence 1014B from the log probability set 1012B, and the decoder 1004C may produce output symbol sequence 1014C from the log probability set 1012C.

In some embodiments, the classification component 112 may feed the output symbol sequences produced from the frames 1008 (e.g., output symbol sequences 1014A-1014C) to a block fusion component 1006. At the block fusion component 1006, the symbols produced by each of the decoders 1014A, 1014B, and 1014C, may be combined together to form fusion symbol sequence 1016. The fusion symbol sequence 1016 may be indexed by the index component 114 shown in FIG. 1, and may then be stored in the speech database 116. Alternatively, as further described below, the query component 118 shown in FIG. 1 may compare the produced fusion symbol sequence 1016 to one or more symbol sequences that are pre-stored in the speech database 116 to generate one or more possible matches.

In other embodiments, the classification component 112 may use the index component 114 to index the symbol sequences produced from the frames 1008 (e.g., output symbol sequences 1014A-1014C) for storage in the speech database 116. Alternatively, as further described below, the query component 118 shown in FIG. 1 may compare the produced symbol sequences to one or more symbol sequences that are pre-stored in the speech database 116 to generate one or more possible matches.

Classifier Ensemble

Figure 11A:
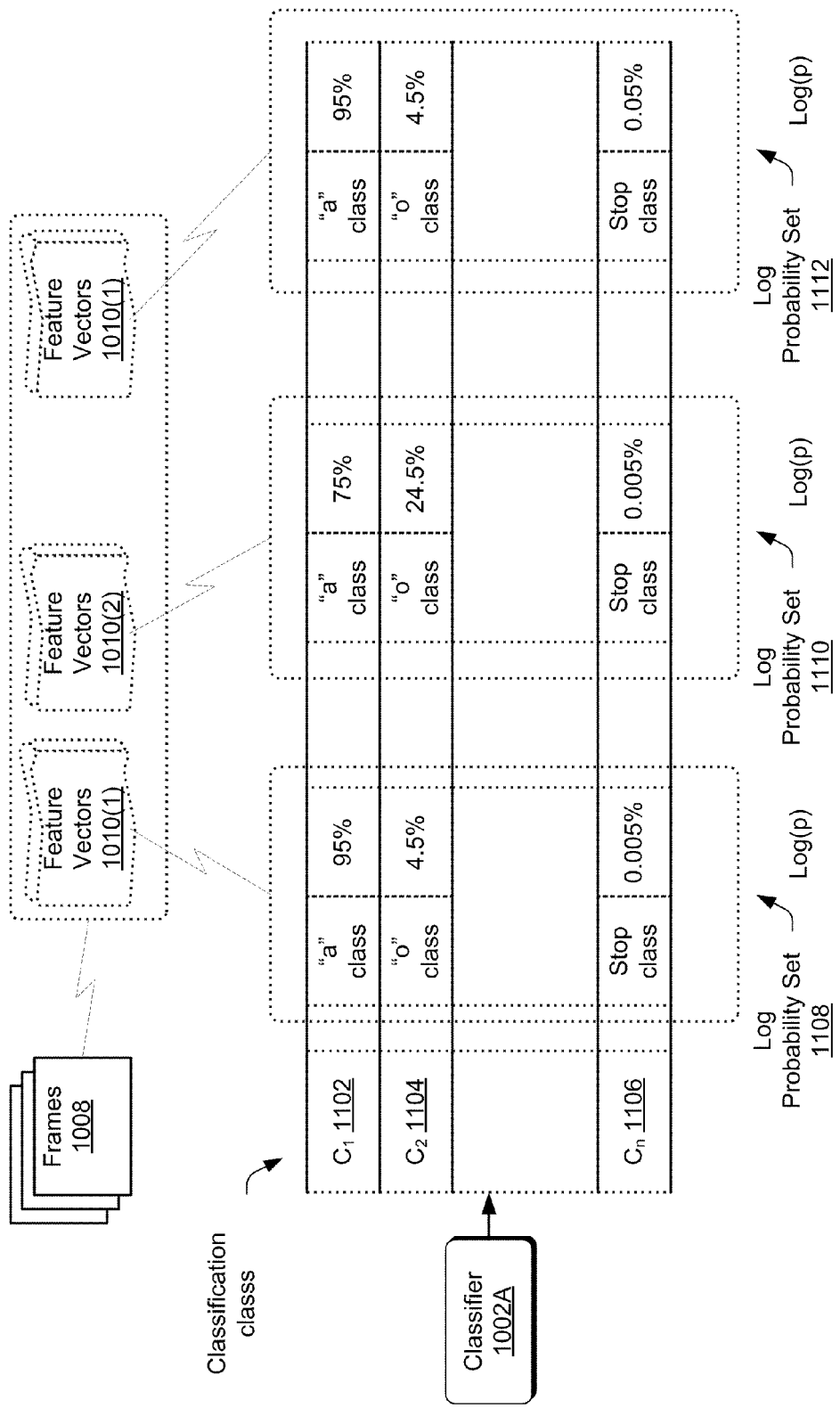
FIG. 11A illustrates the production of exemplary log probability sets by a classifier of a classifier ensemble, in accordance with various embodiments.

FIG. 11A illustrates the production of exemplary log probability sets by a classifier in the classifier ensemble, in accordance with various embodiments. As shown, an exemplary classifier (e.g., classifier ensemble 1002), may classify each feature vector, which corresponds to a single frame of the frames 1008, into a plurality of output classes. For example, but not as a limitation, the classifier 1002A may classify feature vector 1010(1) into output classes 1102-1106. In this particular example, the output class 1102 may be an "a" class that corresponds to phonemes such as "aa" "ao" and "aw". The output class 1104 may be an "o" class that corresponds to phonemes such as "ow" and "oy". The class 1106 may be a stop class that corresponds to sounds such as "k", "d", and "t". Nevertheless it will be appreciated that the phoneme-based classifiers illustrated in FIG. 11A are merely illustrative examples. In various embodiments, the actual implementation of the ensemble may include one or more phoneme-based classifiers, as well as one or more other unsupervised classifiers. For example, in at least one embodiment, the ensemble may include a single supervised classifier based on phonemes, and a plurality of other classifiers that are based on unsupervised classes, e.g., speech transients and other less well understood categories of speech.

Accordingly, for each feature vector that correspond to a frame of a voiced portion, the classifier 1002A may provide the probabilities that the utterance represented by the feature vector fall into each of the classes 1102-1106. As shown in the example, the classifier 1002A may classify the utterance represented by feature vector 1010(1) as having a 95% probability of being in the "a" class, or class 1102, a 4.5% probability of being in the "o" class, or class 1104, and 0.005% probability of being in the stop class, or class 1106. In other words, the classifier 1002A may "think" that the utterance as represented by the feature vector 1010(1), that is, the sound uttered by a speaker and captured by the feature vector 1010(1), has a high probability (95%) of being an "a" class sound, a lesser probability (4.5%) of being an "o" class sound, and very little probability (0.005%) of being a stop class sound.

It will be appreciated that while the feature vector classification illustrated above is described with respect to probabilities, the classifiers are actually implemented with log probabilities (i.e., the log of the probability values) instead of probabilities in various embodiments. In this way the decoders that correspond to the classifiers, as further described below, may then perform additions rather than multiplications on the log probabilities whilst computing the maximum likelihood symbol sequences.

Accordingly, the log probabilities of the utterance represented by the feature vector 1010(1) falling into each of a plurality of classification classes (e.g., classes 1102, 1104, and 1006) may be referred to as a log probability set, (e.g., log probability set 1108).

Further in this example, having classified the feature vector 1010(1) into the log probability set 1108, the classifier 1002A may move to a next feature vector 1010(2), at which the classifier 1002A may classify the utterance of the speaker, as represented by a feature vector 1010(2), into log probability set 1110. Subsequently, the classifier 1002(A) may move to a next feature vector 1010(3), at which the utterance of the speaker as represented by the feature vector 1010(3) may be classified into log probability set 1112. In this way, the classifier 1002A may form log probability sets, such as log probability sets 1012A (FIG. 10), from the log probability set 1108, the log probability set 1110, and the log probability set 1112.

In other words, each of the classifiers 1002A-1002C in the classifier ensemble 1002 may receive a feature vector of each frame and outputs a vector of log probabilities of each of its output classes. For example, given an input feature vector: P(Y|X) where X is the input feature vector and Y is the output class label, all of the classifiers 1002A-1002C may generate P(Y|X) for all Y in its symbol alphabet at each frame. As further described below, the generated P(Y|X) may be eventually consumed by the decoders and decoded into maximum likelihood paths of state transitions.

It will be appreciated that FIG. 11A illustrates an exemplary embodiment where a particular exemplary classifier (e.g., classifier 1002A) may classify feature vector (e.g., feature vector 1010(1)) into output classes 1102-1106. However, each classifier of the classifier ensemble 1002 (FIG. 10) may classify each feature vector (e.g., feature vector 1010(1)) into any number of output classes. For example, classifier 1002A (FIG. 10) may classify a feature vector into 10 output classes, in which a log probability that the feature vector falls into each output class may be generated. In other examples, classifier 1002A may classify a feature vector into 24 classes, or 39 classes, or any plurality of output classes.

Moreover, in some embodiments, each classifier in the classifier ensemble 1002 may classify a feature vector (e.g., feature vector 1010(1)) into identical numbers of output classes as the other classifiers in the ensemble. For example, returning to FIG. 10, each of the classifiers 1002A-1002C may classify feature vector 1010(1) into 10 output classes. However, in other embodiments, at least one classifier in the classifier ensemble 1002 may classify a feature vector into a different number of classes, as in one or more other classifiers in ensemble.

For example, but not as a limitation, the classifier 1002A may classify the feature vector 1010(1) into 10 classes, the classifier 1002B may also classify the feature vector 1010(1) into 10 classes, while the classifier 1002C may classify the feature vector 1010(1) into 24 classes. In another example, but not as a limitation, classifier 1002A may classify the feature vector 1010(1) into 10 classes, the classifier 1002B may classify the feature vector 1010(1) into 24 classes, while the classifier 1002C may classify the feature vector 1010(1) into 39 classes. Moreover, the output classes of each classifier may not have any relationship (semantic, spatial, etc.) to the output classes of the other classifiers in the classifier ensemble 1002. Indeed, the classifier ensemble 1002 may benefit most in terms of classification power when the output classes of the different classifiers are well separated, or orthogonal.

Additionally, as described above, while the classifiers in the classifier ensemble 1002 may be of the same type in some embodiments (e.g., all GMM classifiers), the classifier ensemble 1002 may include at least one classifier that is of a different type than one or more other classifiers. For example, but not as a limitation, the classifier 1002A and the classifier 1002B may be GMM classifiers, while the classifier 1002C may a HMM classifier. In another example, but not as a limitation, the classifier 1002A may be a GMM classifier, the classifier 1002B may be a HMM classifier, while the classifier 1002C may be a MLP classifier.

It will be appreciated that in the various embodiments described above, the classifiers in the classifier ensemble 1002 do not engage in cross talk, that is, each classifier may work independently to classify a set of feature vectors without input from the other classifiers.

Thus, a classifier ensemble that includes classifiers that classify feature vectors into different number of classes, at least two classifiers of different types, and/or both supervised and unsupervised classifiers may enable different classifiers to contribute different aspects to the conversion of speech into symbol sequences. Accordingly, such a classifier ensemble may provide greater robustness to noise and better ability to recognize and utilize idiosyncratic speaking patterns (intra-speaker variations) to improve retrieval accuracy, as well as provide more symbols for each voiced portion to be classified.

Supervised GMM Training

As shown in FIG. 10, the classifier ensemble 1002 may include supervised GMM classifiers. The supervised GMM classifiers may produce log probability sets, such as log probability sets 1012A, based on phonemes or unsupervised classes present in a feature vector, such as feature vector 1010(1).

In various embodiments, the supervised GMM classifiers may be trained based on phoneme labeled speech training data, such as a TIMIT corpus to produce supervised classifiers, or unlabeled training data to produce unsupervised classifiers. The TIMIT corpus is a corpus of phonemically and lexically transcribed speech of American English speakers of both sexes and different dialects. The TIMIT corpus was commissioned by the Texas Instruments (TI) Corporation of Dallas, Tex. and the Massachusetts Institute of Technology (MIT) located in Cambridge, Mass., thereby providing the name TIMIT.

Accordingly, in one example, a GMM classifier may include 10 folded phoneme classes. These phoneme classes are formed by folding together groups of related and confusable phonemes, such as nasals (e.g., "m", "n", "ng"), closures, stops, vowel groups, etc.

In various embodiments, a discriminant analysis algorithm (e.g. LDA) may be implemented to arrive at these "folds". Phonemes may be grouped into different classes or "folded", until the intra-class spread is minimized and the inter-class distance is maximized. For example, as described above, the various "a"-based phonemes, such as "aa", "ae", "ah", "ah", "ao", "aw", "ax", "ay", may be grouped into a single "a" class. Likewise, the "o"-based phonemes, such as "ow" and "oy", may be grouped into a single "o" class. Accordingly, the formation of phoneme classes through folding may minimize the length of the output symbol sequences that the index component index 114 needs to store and retrieve, as well as improve robustness to slight variations in speaking style, intonation, etc. In at least one embodiment, a Fisher discriminant algorithm may be implemented for the analysis.

When the discriminant analysis algorithm has performed the folding of the phoneme classes, a Hidden Markov Model Toolkit (HTK), as developed by the Microsoft Corporation of Redmond, Wash., may be implemented to train class Hidden Markov Models (HMMs). Each HMM may consist of a plurality of states (e.g., 3 states) with state transition probabilities, as well as GMMs of a feature vector. First, each HMM may be trained independently for each class. Subsequently, independent training may be followed by embedded training where the continuity between other classes is learned from training spoken utterances. In this way, the GMM at the center state (e.g., a second state for a 3-state case) of the HMM may be extracted as the GMM data for a GMM classifier.

Unsupervised GMM Training

As further shown in FIG. 10, the classifier ensemble 1002 may include unsupervised GMM classifiers. Like the supervised GMM classifiers, the unsupervised GMM classifiers may produce log probability sets, such as log probability sets 1012A, based on phonemes present in a feature vector, such as the feature vector 1010(1).

In various embodiments, the unsupervised GMM classifiers may be trained by the application of an expectation-maximization (EM) algorithm and an agglomerative clustering strategy to estimate the number of clusters that best represent the data. First, a GMM model may be extracted from data vectors using the EM algorithm. The extraction may output a GMM file with a single class, and N Gaussians in the single class mixture. The GMM file may be obtained in a bottom-up merging fashion by minimizing the minimum description length (MDL) cost function.

The clustering algorithm may be started by initializing with a set of cluster parameters and a user selected number of clusters. Further, the cluster means may be generated by selecting appropriate number of samples from the training data, and all the cluster covariances may be set to be equal to the covariance of the complete data set. After this initialization, the algorithm may enter into a loop in which clusters are combined (or eliminated when empty) until only one cluster remains.

The number of subclasses may be estimated using Rissanen's minimum description length (MDL) criterion. This criterion attempts to determine the number of subclasses which best describes the training data. The approximate maximum likelihood estimates of the mean and covariance of the subclasses are computed using the expectation maximization (EM) algorithm. The output class sizes for the unsupervised classifiers may be based on the local mimina of the derivative of the MDL cost function.

Next, the sub-class Gaussians may be divided into separate classes to produce N classes, each initially with a single Gaussian. Due to the tension inherent in MDL, which favors merging clusters on the one hand (this minimizes the bits needed to describe the model) and minimizing Euclidean distance of a point in feature class to the attracting class on the other hand, optimality may be achieved in a single criterion.

Once the initial unsupervised classifier is trained, the trained unsupervised classifier may be used to partition the training set into N subsets for the N classes. Subsequently, the other target configurations of N-class GMM classifiers may be re-trained on this partitioned training data, e.g., N classes with 1, 2, . . . , Gaussians per class.

The final choice of the classifier may be experimentally determined with real world test data. Additionally, the classifiers that work best in a classifier ensemble may be classifiers that compensate or enhance the weaknesses or strengths of other supervised and unsupervised classifiers in the ensemble.

Optimized Diagonal GMM Classification Algorithm

In some embodiments, the classifiers in a classifier ensemble, such as classifier ensemble 1002, may be optimized to run on portable computing devices. Such portable computing devices may include, but are not limited to, a smart phone, a personal digital assistant (PDA), a digital camera, and the like. Typically, these devices may be constrained in terms of both memory and CPU power. Thus, it may be advantageous to optimize a diagonal GMM classification algorithm that is configured to run on such devices as a part of a classifier ensemble.

For example, a classic diagonal GMM classifier implementation, shown in pseudo-code, may be as follows:

```
Class_LogLikelihood_Vector
ClassifyFeatureVectorToOutputClasses(In_Feature_Vector fv)
{
    Class_LogLikelihood_Vector cv; // return from the classifier
    // Compute the log likelihood for each class (i.e. GMM)
    for each Output Class C in the classifier do
    {
        // Compute log likelihood for each subclass (i.e. individual
Gaussian model)
        for each SubClass SubC do
            SubC.LogLikelihood = SubC.GConst + ½ (fv − SubC.Mean)² .
SubC.Diagonal_Inverse_Covariance_Matrix; // this is a dot product,
result is scalar
        Max Sub LogLikelihood = Max over all (SubC.LogLikelihoods);
        // Sum the weighted subclass log likelihoods
        for each SubClass SubC do
            Sum += Exp(SubC.LogLikelihood − Max Sub LogLikelihood) *
SubC.GaussianWeight;
            cv[index of class C] = Log(Sum) + Max Sub LogLikelihood;
        }done
        return cv;
}
```

In various embodiment, the pseudo-code may be transformed as shown below:

```
Class_LogLikelihood_Vector
OptimizedClassifyFeatureVectorToOutputClasses(In_Feature_Vector fv)
{
    Class_LogLikelihood_Vector cv; //return from the classifier
    // Compute the log likelihood for each class (i.e. GMM)
    for each Output Class C in the classifier do
    {
        // Compute log likelihood for each subclass (i.e. individual
Gaussian model)
        for each SubClass SubC do
            SubC.LogLikelihood = SubC.GConst − (fv . SubC.Theta −
            SubC.Delta)²;
// OPTIMIZATION 1
        Max Sub LogLikelihood = Max over all (SubC.LogLikelihoods);
        // Sum the weighted subclass log likelihoods
        for each SubClass SubC do
            Sum += Exp(SubC.LogLikelihood − Max Sub LogLikelihood +
SubC.LogGaussianWeight); // OPTIMIZATION 2
            cv[index of class C] = Log(Sum) + Max Sub LogLikelihood;
        }done
        return cv;
}
```

As shown, "OPTIMIZATION 1" of the transformed pseudo-code may speed up the diagonal GMM classification algorithm. "OPTIMIZATION 1" may be used to pre-compute the vectors Theta and Delta for each sub-class SubC (i.e., Gaussian of the class mixture) in the following manner, thereby effectively folding in two processing intensive multiply operations into the inner loop:

```
SubC.Theta = SquareRoot(0.5 *
SubC.Diagonal_Inverse_Covariance_Matrix);
    SubC.Delta = SubC.Theta * SubC.Mean;
```

Furthermore, OPTIMIZATION 2 may pre-compute the logs of the sub-class in order to save one multiply operation in the inner loop.

Decoder Ensemble

As shown in FIG. 10, the output log probability sets of the each classifier (e.g., classifier 1002) in a classifier ensemble 1002 may be processed by a corresponding decoder (e.g., decoder 1004A) of a decoder ensemble 1004. Such processing may produce a final output symbol sequence (e.g., output symbol sequence 1014A). In various embodiments, the decoder that corresponds to each classifier may be a Viterbi decoder.

In other words, given the output of N classifiers by the classifier ensemble, a Viterbi decoder (without pruning) may be used to process the output of each classifier to produce the final output symbol sequence for that classifier. Moreover, the N decoders may be executed in parallel as independent Viterbi instances without any cross-talk among the N decoders. The N decoders in the decoder ensemble may produce N independent symbol sequences.

In various embodiments, the underlying state class of each classifier is assumed to be a fully connected graph in which any output symbol is allowed to transition into any other one. Using log likelihoods, the recursive formulation for each decoder (e.g., decoder 1004A) may be as shown below, in which $\psi_j$ represents the max log probability of the MLP output vector $O_t$ and being in phoneme j at time t:

$$\psi_j = \max_i \{\psi_i(t-1) + \log(a_{ij})\} + \log(b_j(o_t)) + SIP \qquad (33)$$

In some embodiments, the language model likelihoods may be replaced by a single symbol insertion penalty (SIP in (33) above, which may be empirically optimized), as the language model likelihoods may be optimized for each classifier in an ad-hoc manner. However, in other embodiments, a symbol language model may be incorporated for each classifier by estimating the transition probabilities from the training data for those classifiers (e.g., by using naïve Bayes and counting at each frame). Thus, the transition probability matrix may be used instead of the single ad-hoc SIP values. The simpler SIP formulation may be mainly used as a space/time optimization, but also this simplification serves us well when the number of output classes is small enough such that the transition probabilities are nearly uniform.

While training the classifier ensemble in some embodiments, a "garbage state" may be optionally defined for some classifiers, which symbolizes speech, i.e., priors that do not fall into any of the symbol categories for that classifier. Additionally, a special "wildcard" category may be defined for the posteriors (i.e., GMM classifiers' output log probabilities), to capture a situation in which there is no clear winning symbol probability.

Accordingly, in at least one embodiment, posterior wild cards may be implemented for the decoders. In various embodiments, a decoder may take the M symbol probabilities for the $i^{th}$ classifier, take the mean and max of M symbol probabilities, and then insert a M+$1^{st}$ wildcard probability (and re-normalize), which may be calculated as follows:

$$P(\text{posterior Wild Card})=(1.0-(\text{MaxProb}-\text{MeanProb}))* (1.0-\text{MaxProb})/\text{Wildcard Strength} \quad (34)$$

The Viterbi algorithm of each decoder may then decode log probability sets outputted by a corresponding classifier using this expanded vector of symbol probabilities. The posterior wildcard and the prior wildcard, i.e., the garbage state, may be considered to be in the same cluster for convenience, and signify speech for which there is no clearly discernable class label, e.g., mumbling. Accordingly, in some embodiments, the index component 114 may index the combined wildcard cluster along with all the other symbol sequences.

FIG. 11B illustrates the operations of an exemplary decoder as included in the decoder ensemble 1004, in accordance with various embodiments of noise robust speech classifier ensembles. As described above, for each feature vector that corresponds to a frame of a voiced portion, the classifier 1002A may provide the probabilities that the utterance represented by the feature vector fall into each of the classes 1102-1106. As shown in the example, the classifier 1002A may classify the utterance represented by feature vector 1010 (1) as having a 95% probability of being in the "a" class, or class 1102, a 4.5% probability of being in the "o" class, or class 1104, and 0.005% probability of being in the stop class, or class 1106. In other words, the classifier 1002A may "think" that the utterance as represented by the feature vector 1010(1), that is, the sound uttered by a speaker and captured by the feature vector 1010(1), has a high probability (95%) of being an "a" class sound, a lesser probability (4.5%) of being an "o" class sound, and very little probability (0.005%) of being a stop class sound.

Further in this example, having classified feature vector 1010(1) into the log probability set 1108, the classifier 1002A may move to a next feature vector 1010(2), where the utterance of the speaker as represented by the feature vector 1010 (2) may be classified into a log probability set 1110. Subsequently, the classifier 1002(A) may to a next feature vector 1010(2), where the utterance of the speaker as represented by the feature vector 1010(3) may be classified into a log probability set 1112. In this way, the classifier 1002A may form log probability sets, such as log probability sets 1012A (FIG. 10), from the log probability set 1108, the log probability set 1110, and the log probability set 1112.

The exemplary decoder 1004 may use the Viterbi algorithm described above to convert the log probability set 1108, the log probability set 1110, and the log probability set 1112, as produced by the classifier, into an output symbol sequence. In the example shown, the decoder 1004 may use the Viterbi algorithm to analyze all of the possible "paths" that lead from each class in probability set 1108, through each output class in the probability set 1110, to each class in the probability set 1112. For the purpose of illustration, paths 1114-1118 are shown, although it will be appreciated that many more paths are actually present. By using the Viterbi algorithm described above, the exemplary decoder 1004 may determine that path 1118 is the most likely path, as the log probabilities traversed by the path 1118 (illustrated as normal probabilities 95%, 75%, 95% for clarity, respectively) show the least amount of variability when compared to 95%, 24.5%, 95% of path 1116, and 95%, 0.005%, 95% of path 1114. In other words, the maximum likelihood path computed via equation (33) above gets maximized whilst traversing path 1118.

Moreover, for the purpose of illustration, given that the "a" output class may be represented by a symbol "A", the "o" class may be represented by a symbol "B", and the stop class may be represented by a symbol "C", the exemplary decoder 1004 may derive an output symbol sequence "A, A, A" from the frames 1008. In other words, the exemplary decoder 1004 may transform the speech utterance encapsulated in the frames 1008 into a representative output symbol sequence "A, A, A". However, in some actual embodiments of implementation, the exemplary decoder 1004 may for purposes of indexing, simply index a symbol: "A" and add side information that its duration was 3 frames, instead of indexing 3 "A" symbols, each of duration 1 frame, such implementation leads to a more compact representation.

Block Fusion Component

As shown in FIG. 10, the classifier ensemble 1002 may include various classifiers. These classifiers may be of heterogeneous types (e.g., MLPs combined with GMMS, which are also combined with HMMs). Moreover, the classifiers may be trained in various styles (e.g., supervised, unsupervised). Further, the classifiers may have different number of output classes. For example, but not as a limitation, the classifier ensemble 1002 may include a classifier that outputs into 10 classes, a classifier that outputs into 24 classes, and a classifier that outputs into 39 classes. Additionally, the classifiers may generate output symbol sequences that include symbols of different durations.

As shown in FIG. 10, the block fusion component 1006 may use block fusion to combine the output symbol sequences from these heterogeneous classifiers into a single fusion symbol sequence, such as fusion symbol sequence 1016. In contrast, conventional symbol-to-symbol fusion approaches to combining outputs of a plurality of classifiers require that the plurality of classifiers to be homogenous. In other words, the plurality of the classifiers must have the same number of output classes, the same output alphabet (i.e., use the same symbols), and that the symbols of the output symbol sequences must have the same duration.

The block fusion component 1006 may use a block-based fused approach to combine a plurality of output symbol sequences into a fusion symbol sequence. The operation of block fusion component may be further described in relation to FIG. 12.

Figure 12:
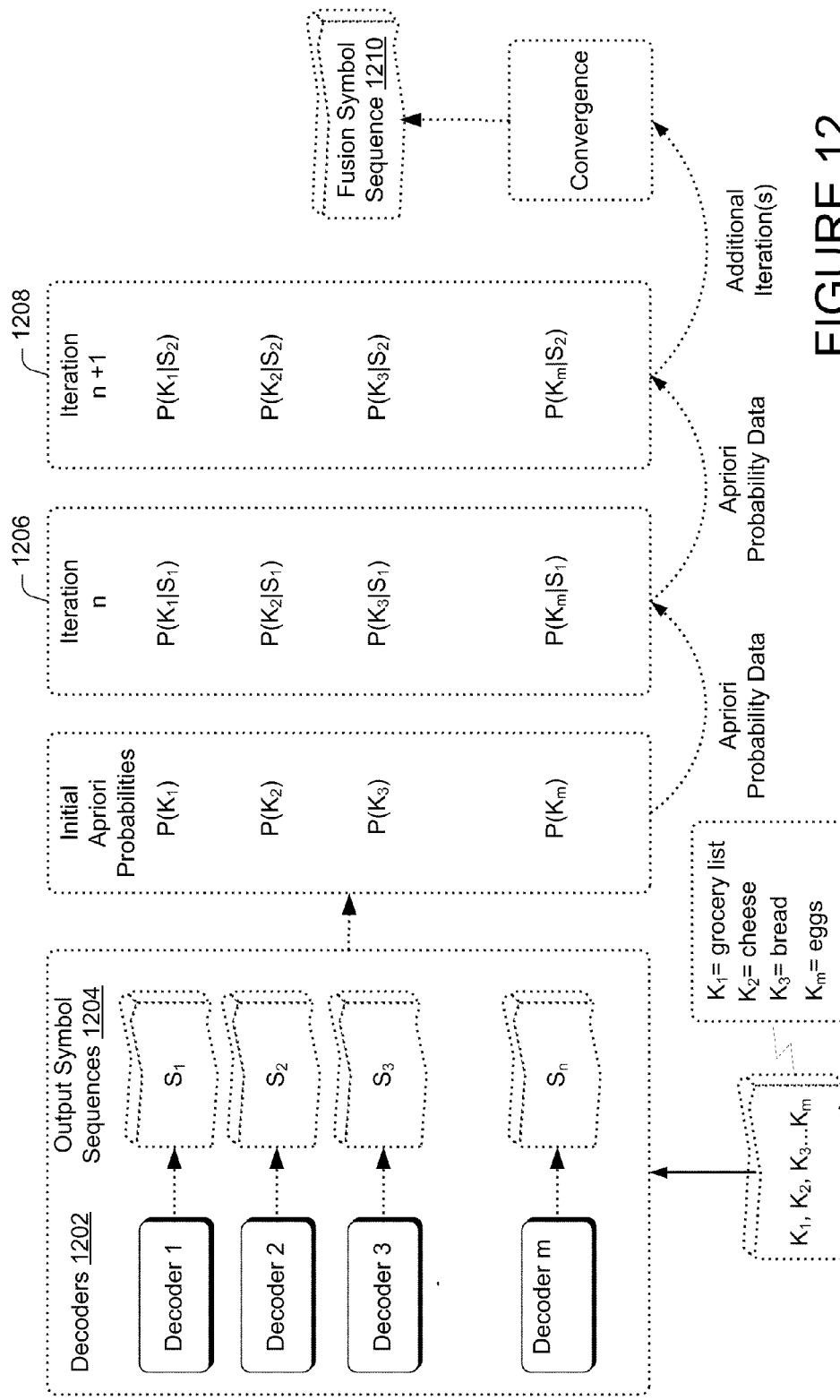
FIG. 12 illustrates the operation of an exemplary block fusion component, in accordance with various embodiments.

FIG. 12 illustrates the operation of an exemplary block fusion component 1006, in accordance with various embodiments of noise robust speech classifier ensembles. As shown, each of the N decoders 1202, $D_1$, $D_2$, $D_3$, ... $D_n$, may respectively output symbol sequences 1204 $S_1$, $S_2$, $S_3$, ... $S_n$, Accordingly, the block fusion component 1006 may attempt to classify the output symbol sequences into one of M possible message blocks, where each of $K_1$, $K_2$, $K_3$, ... $K_m$ may represent a message block. For example, each of $K_1$, $K_2$, $K_3$, ... $K_m$ may be the individual words (e.g., cheese, bread, eggs) or the individual phrases (e.g. grocery list) that are present in any speech. The block-based fused approached may enable the block fusion component 1006 to classify each of symbols in the output symbol sequences, as provided by the classifier ensemble 1002 and the decoder 1004, into one of the message blocks.

Thus, given that $P(K_1)$, $P(K_2)$, $P(K_3)$, and $P(K_m)$ are the initial apriori probabilities of different message blocks M, the block-based fused approach may be described as below:

```
1. Set the apriori probability vector p_0 to the set of initial apriori
probabilities.
2. Perform the following iteration:
    j = 0 // iteration count
    For classifier k = 1:N {
        Calculate aposteriori probability vector q_j from observation S_k
        and apriori vector p_j
            Set apriori vector p_(j+1) = q_j
            j = j+1
        if(convergecriteria is not met)
            repeat loop
```

In other words, the aprior probabilities of different message blocks M, $P(K_1)$, $P(K_2)$, $P(K_3)$, and $P(K_m)$, may be fed by the block fusion component 2006 into an iteration 1206, in which $P(K_1|S_1)$ may be performed on $P(K_1)$, $P(K_2|S_1)$ may be performed on $P(K_2)$, $P(K_3|S_1)$ may be performed on $P(K_3)$, and $P(K_m|S_1)$ may be performed on $P(K_m)$. Each of the P( ) operations in iteration 1206 provide the probability of $P(K_1)$, $P(K_2)$, $P(K_3)$, and $P(K_m)$ given $S_1$. Subsequently, the probabilities generated in iteration 1206 may be fed as apriori probabilities into iteration 1208.

At iteration 1208, the block fusion component 1006 may perform a series of similar operations by which $P(K_1|S_2)$ may be performed given $S_2$, $P(K_2|S_2)$ may be performed given $S_2$, $P(K_3|S_2)$ may be performed given $S_2$, and $P(K_m|S_2)$ may be performed given $S_2$. In this way, the plurality of iterations may be further performed in this manner using the remainder output symbol sequences of of $S_1, S_2, S_3, \ldots S_n$ until convergence is reached. Accordingly, at the point convergence, the block fusion component 1006 may provide the fusion symbol sequence 1210.

Accordingly, the exemplary block fusion component 1006 may enable the block based fusion of any set of heterogeneous classifiers in the classifier ensemble 1002 to generate a fusion symbol sequence. The complexity of such iterative decoding may scale linearly with the number of classifiers in the ensemble.

Indexing Component

As shown in FIG. 1, the indexing component 114 may index the symbol sequences generated by the classification component 112 for storage in the speech database 116. The symbol sequences indexed by the indexing component 114 may include both output symbol sequences generated by the decoder ensemble 1004, and fusion symbol sequences, such as fusion symbol sequence 1016, as generated by the block fusion component 1006. In some embodiments, the indexing component 114 may generate an index identifier for each symbol sequence. For example, but not as a limitation, given a fusion symbol sequence "A, B, C", the indexing component 114 may assign an index identifier "F5" to the fusion symbol sequence, and then store the fusion symbol sequence in the speech database 116.

In other embodiments, the indexing component 114 may generate an index identifier for a plurality of symbol sequences that correspond to a particular speech utterance. For example, but not as a limitation, the indexing component 114 may group together output symbol sequences 1014A-1014C, as they are symbol sequences generated by a plurality of classifiers for a common set of feature vectors 1010(1)-1010(3) of a particular speech utterance. The indexing component 114 may assign a common index identifier "U10" for the group of output symbol sequences 1014A-1014C, prior to storing the set of symbol sequences in the speech database 116.

Query Component

As shown in FIG. 1, the query component 118 may work cooperatively with the index component 116 to query a query symbol sequence against one or more output symbol sequences that are pre-stored in the speech database 116. The query component 118 may then generate a list of one or more pre-stored output symbol sequences in the speech database 116 that match the query symbol sequence. The speech data, that is, utterances that correspond to the generated list of pre-stored output symbol sequences, may then be retrieved and displayed for manipulation (e.g., retrieval of the speech data, modification of the speech data, deletion of the speech data, organization of the speech data, presentation of the speech data, and/or the like). In various embodiments, the generated list may be display based on the order of relevance, dates of recording, and/or other criteria.

In various embodiments, the query component 118 may use a scoring algorithm that implements a union over N independent query time matching paths to retrieve the best speech data that matches a query symbol sequence. This algorithm is illustrated in FIG. 13.

Figure 13:
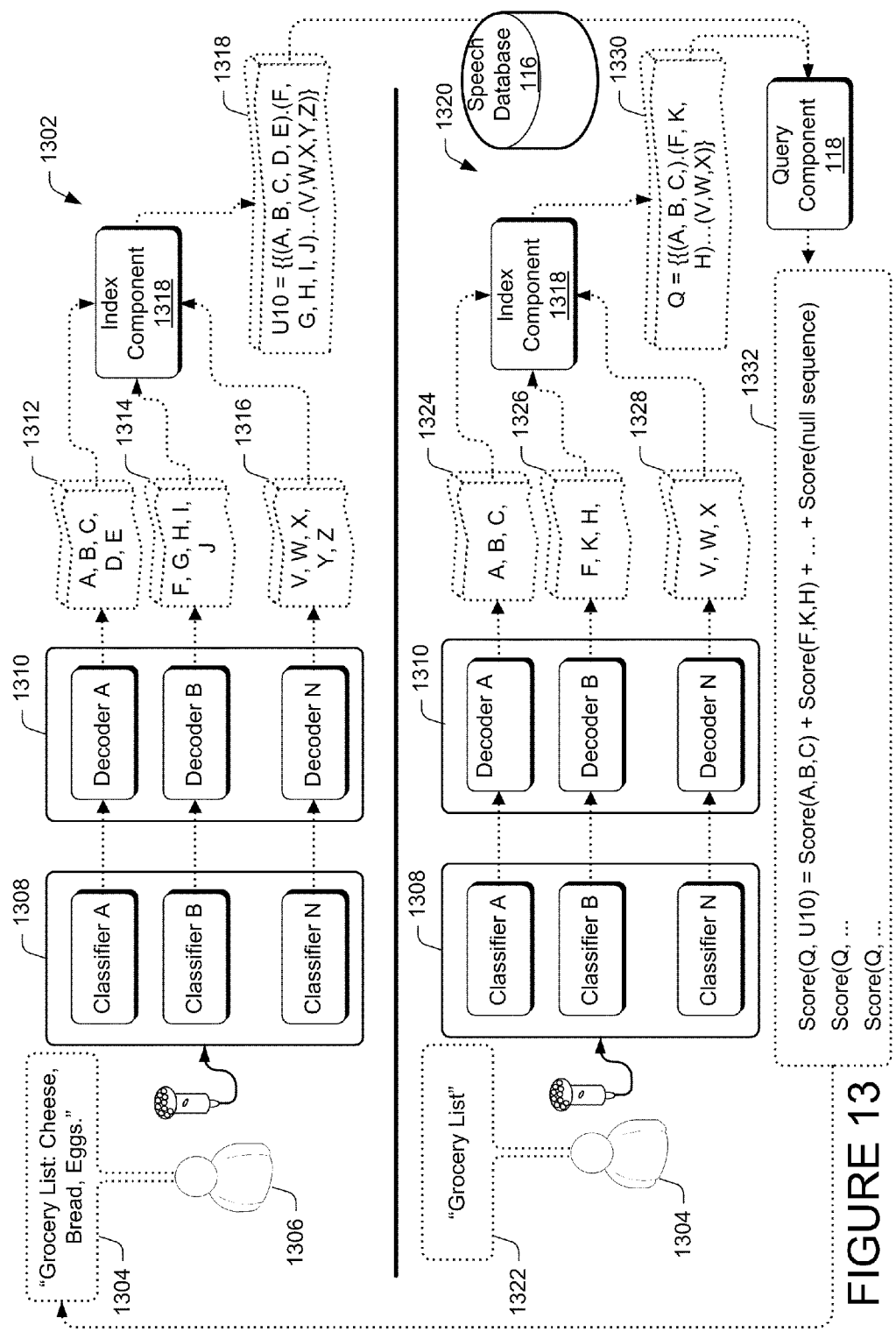
FIG. 13 illustrates the performance of a union over N independent query time matching paths to retrieve the best speech data, in accordance with various embodiments.

FIG. 13 illustrates the performance of a union over N independent query time matching paths to retrieve the best speech data, in accordance with various embodiments. As shown, a speech utterance 1304 from a user 1306 may be inputted into an exemplary classifier ensemble 1308 at storage time 1302. The speech utterance 1302 may state "Grocery List, Cheese, Bread, and Eggs." The classifier ensemble 1302 may include three independent classifiers (e.g., classifiers A, B, and N). The classifier ensemble 1306 may work in conjunction with an exemplary decoder ensemble 1310 to generate output symbol sequences that represent the speech utterance 1302. For example, the classifier A and the decoder A may generate a symbol sequence 1312 (e.g., A, B, C, D, E). Likewise, the classifier B and the decoder B may generate a symbol sequence 1314 (e.g., F, G, H, I, J). Additionally, the classifier C and the decoder C may generate a symbol sequence 1316 (e.g., V, W, X, Y, Z).

Subsequently, an index component 1318 may perform a concatenation operation that associates all the symbol sequences (paths) 1312-1316 and assigns an index identifier. The result of this concatenation operation may be represented by the notation 1318, which is "U10={{(A, B, C, D, E).(F, G, H, I, J) . . . (V,W,X,Y,Z)}", in which "U10" may be stored in the index identifier. The indexed symbol sequences and the speech utterance 1304 may in the speech database 116 (FIG. 1). It will be appreciated that the classifier ensemble 1308 and the decoder ensemble 1310 may be any of a plurality of classifiers and decoders, respectively. Accordingly, the classifiers and the decoders shown are exemplary rather than limiting. Moreover, the speech utterance 1304 may be one of any plurality of speech utterances that are captured and indexed by the classifier ensemble 1308, the decoder ensemble 1310, and the index component 1318.

At a later retrieval time 1320, the user 1304 may attempt to search for the speech utterance 1304. Accordingly, the user 1304 may input a query speech utterance 1322 to the classifier ensemble 1308 and the decoder ensemble 1310. The speech utterance 1302 may state "Grocery List." Accordingly, the ensembles 1308 and 1310 may generate query symbol sequences for the speech utterance 1322. For example, the classifier A and the decoder A may generate a symbol sequence 1324 (e.g., A, B, C,). Likewise, the classifier B and the decoder B may generate a symbol sequence 1326 (e.g., F, K, H). Additionally, the classifier C and the decoder C may generate a symbol sequence 1328 (e.g., V, W, X).

Subsequently, an index component 1318 may perform a union operation that associates all the symbol sequences (paths) 1324-1328 of the query. The result of this union operation may be represented by the notation 1330, which is "Q={{(A, B, C,).(F, K, H) . . . (V,W,X)}".

The query component 118 may perform scoring operations 1332 that would attempt to match the query to one or more symbol sequences that are stored in the speech database 116. In various embodiments, the querying component 118 may compute a match score for each query path associated with each index identifier, and add the scores together to determine whether one or more symbol sequences stored in the speech database 116 match the query symbol sequence. For example, the querying component 118 may compute the match scores between the query symbol sequence and stored symbol sequence 1318 as follows:

$$\text{Score}(Q, U10) = \text{Score}(A,B,C) + \text{Score}(F,K,H) + \ldots + \text{Score}(\text{null sequence}) \quad (36)$$

Thus, provided that the result of "Score(Q, U10)" is sufficiently high, that is, higher than other the scores computed for the query symbol sequence and other indexed symbol sequences stored in the speech database 116, speech utterance 1304 may be retrieved from the speech data 116 as the most likely match to query speech utterance 1322. The speech utterance 1304 may be presented to the user 1304 for further manipulation. In some embodiments, one or more speech utterances associated with other symbol sequences stored speech database 116 may also be retrieved and presented, as they may have match scores that are lower than the speech utterance 1304. For example, any stored speech utterances that includes the word "list" may be computed as having a lower match score, but would be retrieved as possible matches if their score exceed a predetermined threshold.

Therefore, as can be observed, the total score of the query with respect to any given speech utterance in the database, e.g., U10, is the sum or union over all its N independent partial matches with the speech utterance, e.g., U10.

In at least some embodiments, the match score computation performed by the query component 118 may be based on the use of n-gram models, a type of probabilistic modeling for predicting items in a sequence. Moreover, it will be appreciated the n-gram models may also be used to determine a query symbol sequence and a fusion symbol sequence, such as fusion symbol sequence 1016 (FIG. 10), in various other embodiments.

Returning to FIG. 10, it will be appreciated that the classification component 112 may enable the pluggable addition of classifiers to the classifier ensemble 1002. Thus, the classifiers 1002A-1002C are merely illustrative rather than limiting. Accordingly, the addition of classifiers having classes that complement the classes of other classifiers may add new or independent information that the existing classifiers do not have the ability to access, thereby increasing the overall accuracy of the classification component 112. Thus, overall speech recognition accuracy may also be increased. Thus, it will be appreciated that a classifier ensemble that enables the pluggable addition of different classifiers, when implemented on computing platforms of ever increasing power (e.g., expanded memory and improved CPU capability), may provide even more dramatic increases in speech recognition accuracy.

Figure 14:
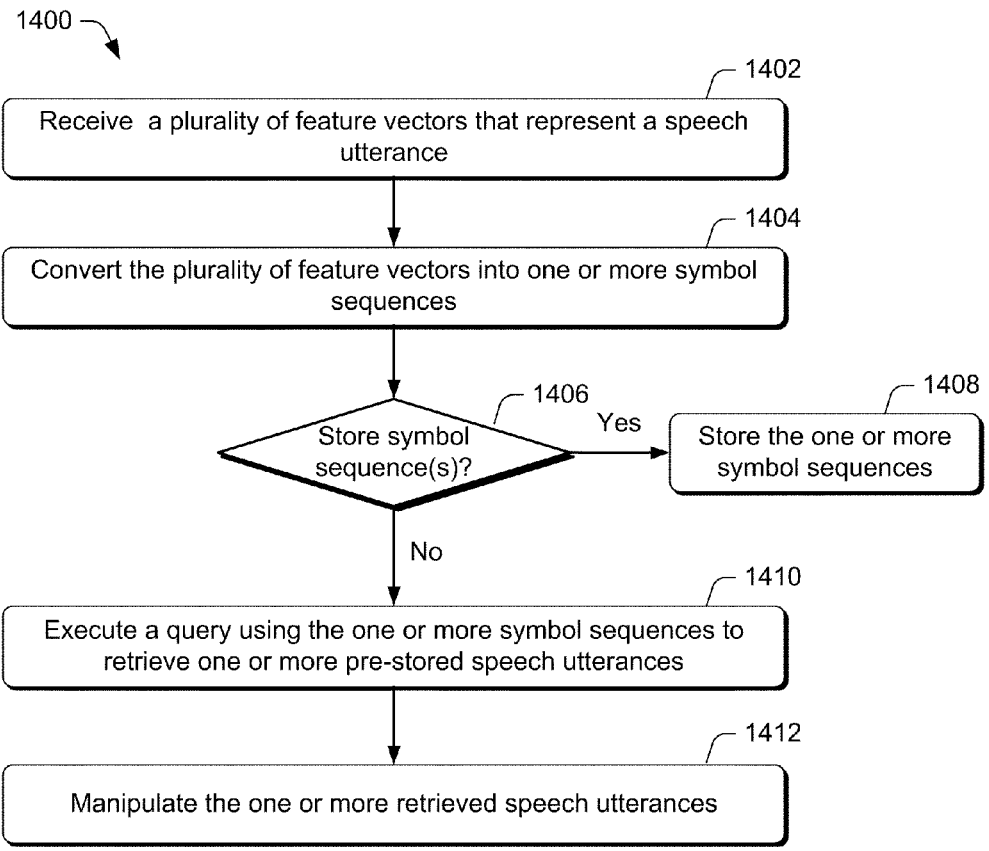
FIG. 14 shows a flow diagram illustrating an exemplary process for using a classifier ensemble to process a speech utterance, in accordance with various embodiments.

FIG. 14 shows a flow diagram illustrating an exemplary process 1400 for using a classifier ensemble to process a speech utterance, in accordance with various embodiments. FIG. 14 is illustrated as a collection of blocks in a logical flow diagram, which represents a sequence of operations that can be implemented in hardware, software, and a combination thereof. In the context of software, the blocks represent computer-executable instructions that, when executed by one or more processors, cause the one or more processors to perform the recited operations. Generally, computer-executable instructions include routines, programs, objects, components, data structures, and the like that cause the particular functions to be performed or particular abstract data types to be implemented. The order in which the operations are described is not intended to be construed as a limitation, and any number of the described blocks can be combined in any order and/or in parallel to implement the process.

At block 1402, the classification component 112 (FIG. 1) may receive a plurality of feature vectors that represent a received speech utterance. In various embodiments, the classification component 112 may receive the one or more feature vectors from a component that converts input audio signals into feature vectors, such as the noise compensated feature pipeline 110. The feature vectors may be derived from a plurality of frames of an input audio signal.

At block 1404, the classification component 112 may convert the plurality of feature vectors into one or more symbol sequences. In various embodiments, the classification component 112 may perform the conversion of the plurality of feature vectors into a plurality of output symbol sequences using a classifier ensemble, such as the classifier ensemble 1002 (FIG. 10), and a decoder ensemble, such as the decoder ensemble 1004. In some embodiments, the classification component 112 may use a block fusion component 1006 to combine the one or more output symbol sequences into a single fusion output symbol sequence.

At decision block 1406, the speech recognition-capable device 102 may determine whether the one or more symbol sequences should be stored in data storage. If the speech recognition-capable device 102 determines that the one or more symbol sequences are to be stored in the data storage ("yes" at decision block 1406), the process 1400 may proceed to 1408.

At block 1408, the speech recognition-capable device 102 may index and store the one or more symbol sequences that represent a received speech utterance into the speech database 116. In various embodiments, the one or more symbol sequences may be stored if a user has commanded the speech recognition-capable device 102 to store the received speech utterance (e.g., activate the speech recognition-capable device 102 to store the received speech).

However, if the speech recognition-capable device 102 determines that one or more symbol sequences are not to be stored in the speech database 116 ("no" at decision block 1406), the process 1400 may proceed to block 1410.

At block 1410, the speech recognition-capable device 102 may use a query component 118 to execute a query using one or more symbol sequences from the classification component 112. The query may be executed against one or more symbol sequences that are previously stored on the speech database 116. In various embodiments, the query may be execute using a n-gram model based scoring algorithm that compares the one or more query symbol sequences against the pre-stored symbol sequences to find one or more relevant pre-stored symbol sequences. Accordingly, the query component 118 may retrieve pre-stored speech utterances that correspond to the one or more relevant pre-stored symbol sequences.

In some embodiments, the query component 118 may implement parallel queries using different symbol sequences derived from the same speech utterance. For example, the query component 118 may implement queries using the output symbol sequences that are directly outputted by the decoder ensemble 1006, as well as the fusion symbol sequences outputted by the block fusion component 1106.

Thus, the query component 118 may retrieve pre-stored speech utterances that correspond to the one or more relevant pre-stored symbol sequences, as determined based on any of the different symbol sequences. Alternatively, the query component 118 may retrieve pre-stored speech utterances that correspond to the one or more relevant pre-stored symbol sequences, as determined based only on the output symbol sequences, or only on the fusion output sequences.

At block 1412, the speech recognition-capable device 102 may present the one or more retrieved speech utterances for manipulation. For example, the retrieved speech data may be presented or played back, modified, deleted, reorganized, and/or the like.

Figure 15:
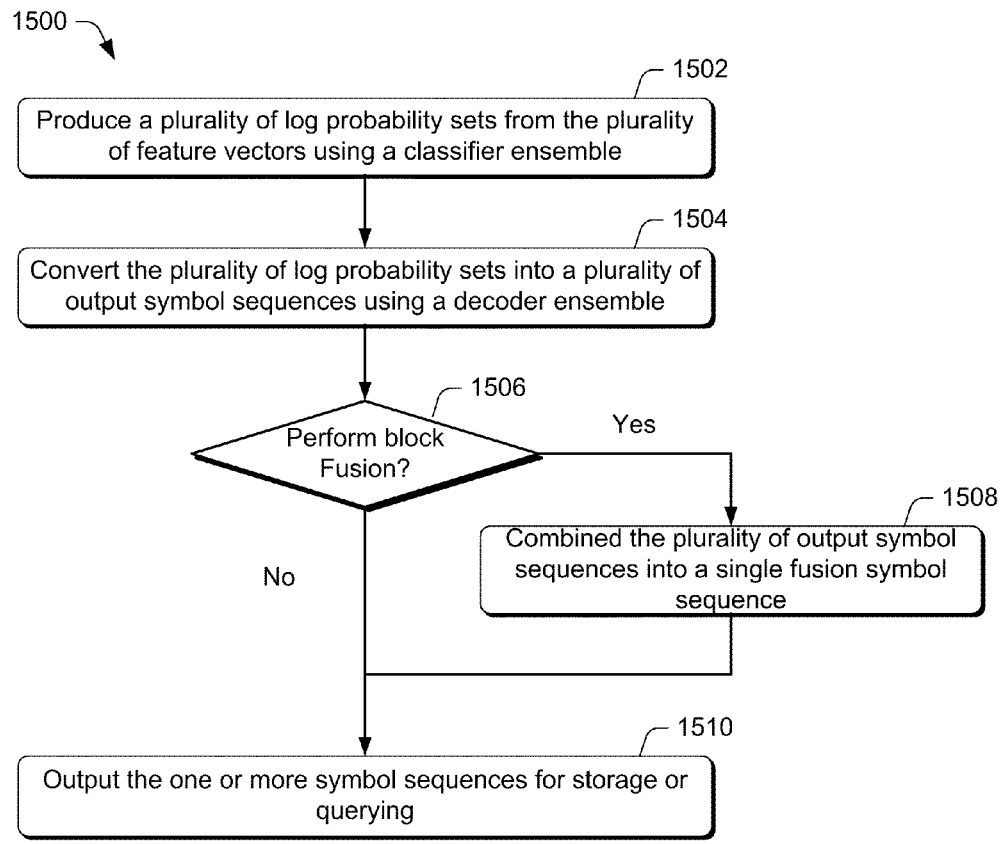
FIG. 15 shows a flow diagram illustrating an exemplary process for converting a plurality of feature vectors into one or more symbol vectors, in accordance with various embodiments.

FIG. 15 shows a flow diagram illustrating an exemplary process 1500 for converting a plurality of feature vectors into one or more symbol vectors, in accordance with various embodiments. FIG. 15 may further illustrate block 1404 of process 1400. FIG. 15 is illustrated as a collection of blocks in a logical flow diagram, which represents a sequence of operations that can be implemented in hardware, software, and a combination thereof. In the context of software, the blocks represent computer-executable instructions that, when executed by one or more processors, cause the one or more processors to perform the recited operations. Generally, computer-executable instructions include routines, programs, objects, components, data structures, and the like that cause the particular functions to be performed or particular abstract data types to be implemented. The order in which the operations are described is not intended to be construed as a limitation, and any number of the described blocks can be combined in any order and/or in parallel to implement the process.

At block 1502, the classifier ensemble 1002 (FIG. 10) of the classification component 112 may produce a plurality of log probability sets from the plurality of feature vectors that represent a speech utterance. It will be appreciated that the classifier ensemble 1002 may include different types of classifiers (e.g., GMM, HMM, HLP). Moreover, the classifier ensemble 1002 may include supervised and unsupervised classifiers. Each of the classifiers may produce a log probability set that covers different classification classes, durations, and/or the like.

At block 1504, the decoder ensemble 1004 of the classification component 112 may convert the plurality of log probability sets into a plurality of output symbol sequences. In various embodiments, each of the decoders in the decoder ensemble 1004 and each of the classifiers in the classifier ensemble 1002 may share a one-to-one correspondence.

At decision block 1506, the classification component 112 may determine whether the block fusion component 1006 should combine the plurality of output symbol sequences into a single fusion symbol sequence. In at least one embodiment, the classification component 112 may make this determination based on a preference setting of the speech recognition-capable device 102. If the classification component 112 determines that the block fusion component 1006 should perform its task, ("yes" at decision block 1506), the process 1500 may proceed to block 1508.

At block 1508, the block fusion component 1006 may combine the plurality of output symbol sequences into a fusion symbol sequence based on an apriori probability algorithm. However, if the classification component 112 determines that no block fusion is necessary, ("no" at decision block 1506), the process 1500 may proceed to block 1510.

At block 1510, the classification component may output one or more symbol sequences, either the output symbol sequences from block 1504, or the fusion input symbol sequence from block 1508, for storage or querying. However, it will be appreciated that in some instances, the classification component 112 may output both the output symbol sequences from block 1504 and the fusion input symbol sequence from block 1508 for storage or querying.

Exemplary Computing Environment

Figure 16:
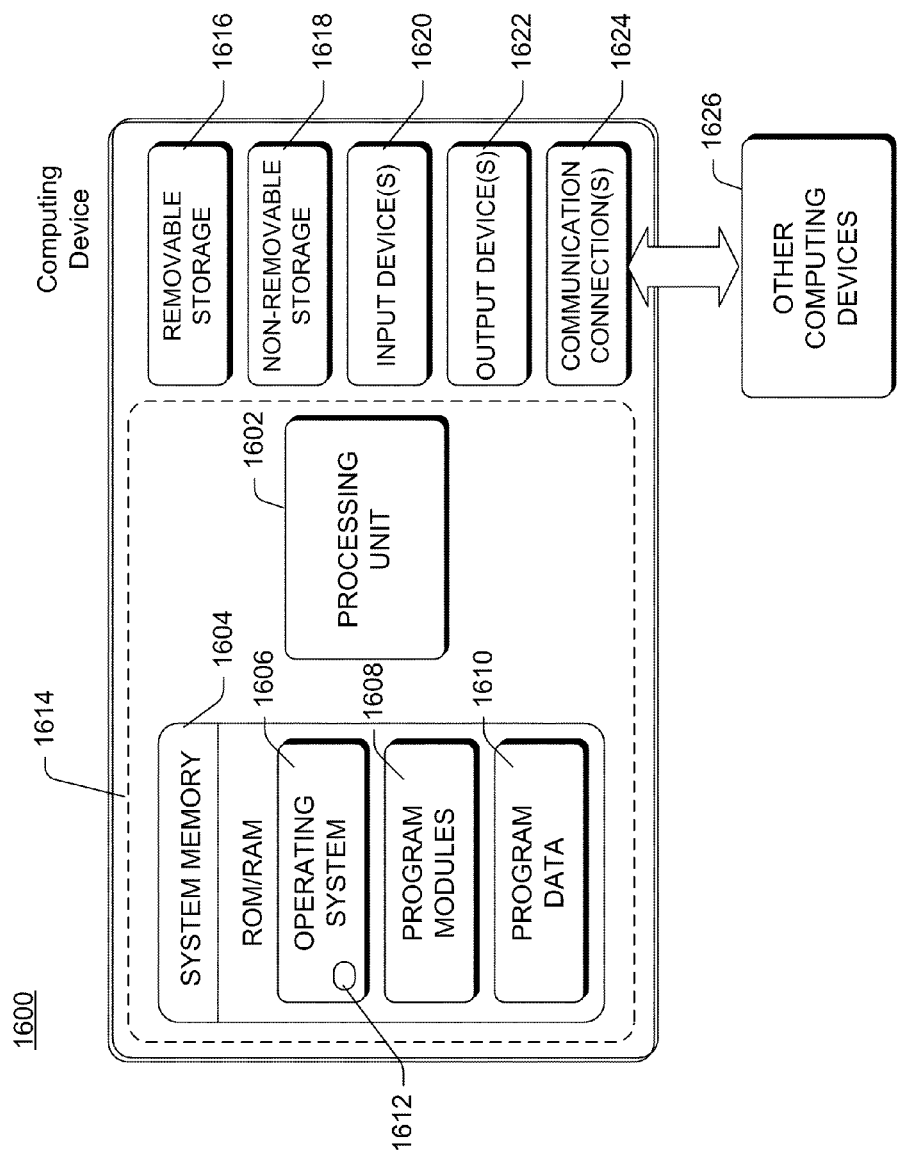
FIG. 16 illustrates a representative computing system that is used to implement techniques and mechanisms for using a noise robust speech classifier ensemble.

FIG. 16 illustrates a representative computing system 1600 that is used to implement techniques and mechanisms for adaptively learning translation layout patterns of bilingual web pages for the extraction of bilingual translation pairs. The speech recognition-capable device 102, as described in FIG. 1, may be implemented using the computing system 1600. However, it will readily appreciate that the techniques and mechanisms may be implemented in other computing devices, systems, and environments. The computing system 1600 shown in FIG. 16 is only one example of a computing device and is not intended to suggest any limitation as to the scope of use or functionality of the computer and network architectures. Neither should the computing system 1600 be interpreted as having any dependency or requirement relating to any one or combination of components illustrated in the example computing device.

In a very basic configuration, computing system 1600 typically includes at least one processing unit 1602 and system memory 1604. Depending on the exact configuration and type of computing device, system memory 1604 may be volatile (such as RAM), non-volatile (such as ROM, flash memory, etc.) or some combination of the two. System memory 1604 typically includes an operating system 1606, one or more program modules 1608, and may include program data 1610. The operating system 1606 includes a component-based framework 1612 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 1600 is of a very basic configuration demarcated by a dashed line 1614. Again, a terminal may have fewer components but will interact with a computing device that may have such a basic configuration.

Computing system 1600 may have additional features or functionality. For example, computing system 1600 may also include additional data storage devices (removable and/or non-removable) such as, for example, magnetic disks, optical disks, or tape. Such additional storage is illustrated in FIG. 16 by removable storage 1616 and non-removable storage 1618. Computer storage media may include volatile and nonvolatile, removable and non-removable media implemented in any method or technology for storage of information, such as computer readable instructions, data structures, program modules, or other data. System memory 1604, removable storage 1616 and non-removable storage 1618 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing system 1600. Any such computer storage media may be part of device 1600. Computing system 1600 may also have input device(s) 1620 such as keyboard, mouse, pen, voice input device, touch input device, etc. Output device(s) 1622 such as a display, speakers, printer, etc. may also be included. These devices are well known in the art and are not discussed at length here.

Computing system 1600 may also contain communication connections 1624 that allow the device to communicate with other computing devices 1626, such as over a network. These networks may include wired networks as well as wireless networks. Communication connections 1624 are some examples of communication media. Communication media may typically be embodied by computer readable instructions, data structures, program modules, etc.

It is appreciated that the illustrated computing system 1600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The use of a voice activity detector and a noise compensated feature pipeline may reduce the amount of audio data that a speech recognition device needs to analyze to perform matching between different stored speech utterances. The various embodiments may be implemented on small portable electronic devices with constrained memory and processing capabilities, as well as other computing devices.

Moreover, the implementation of classifier ensemble for speech recognition enables the addition of classifiers having classes that complement the classes of other classifiers. Accordingly, the additional classifiers may add new or independent information that the other classifiers do not have the ability to access. Thus, overall speech recognition accuracy may be increased. Moreover, a classifier ensemble that enables the pluggable addition of different classifiers, when implemented on computing platforms of ever increasing power (e.g., expanded memory and improved CPU capability), may provide even more dramatic increases in speech recognition accuracy.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A method, comprising:
converting a plurality of feature vectors that represents a speech utterance into a plurality of log probability sets, the converting using a classifier ensemble including a plurality of classifiers;
transforming the plurality of log probability sets into a plurality of output symbol sequences;
combining the plurality of output symbol sequences, using an iterative a priori probability calculation algorithm, into a fusion output symbol sequence; and
retrieving one or more speech utterances from a speech database using the plurality of output symbol sequences.

2. The method of claim 1, wherein the retrieving the one or more speech utterances from the database comprises using the fusion output symbol sequence.

3. The method of claim 1, wherein the classifier ensemble includes at least one supervised classifier and at least one unsupervised classifier.

4. The method of claim 1, wherein the classifier ensemble includes at least two classifiers from a group of classifiers that comprises a Gaussian Mixture Model (GMM) classifier, a Hidden Markov Model (HMM) classifier, a Multi-level Preceptron (MLP) classifier.

5. The method of claim 1, wherein at least two classifiers in the classifier ensemble include different sets of independent and unrelated classes, and wherein the output symbol sequences include symbols that cover different durations within the speech utterance.

6. The method of claim 1, wherein at least two classifiers in the classifier ensemble include different number and types of classification classes.

7. The method of claim 1, wherein the transforming is performed by decoder ensemble, which includes a Viterbi decoder having a wildcard probability category, the wildcard probability category to capture a symbol of one of the output symbol sequences that has no clear winning symbol probability.

8. The method of claim 1, wherein the retrieving is performed by a query component, which uses a n-gram based scoring algorithm that associates the plurality of output symbol sequences in an union operation during retrieval of one or more speech utterances from a speech database.

9. The method of claim 1, further comprising:
converting an input audio signal into the plurality of feature vectors and
compensating for noise in the input audio signal using frequency bins in each of a plurality of frames that are included in the input audio signal.

10. The method of claim 1, further comprising:
separating an input audio signal into voiced portions and unvoiced portions based at least on a smooth log power, a spectrum entropy, and a maximum amplitude in each of a plurality of frames included in the input audio signal; and
converting the voiced portions of the input audio signal into the plurality of feature vectors.

11. A computer-readable storage device storing computer-executable instructions that, when executed, cause one or more processors to perform acts comprising:
converting a plurality of feature vectors into a plurality of log probability sets using a classifier ensemble that includes a plurality of classifiers, the plurality of feature vectors representing a speech utterance;
transforming the plurality of log probability sets into a plurality of output symbol sequences using a decoder ensemble that includes a plurality of decoders;
combining the plurality of output symbol sequences into a fusion output symbol sequence using a block fusion algorithm, the block fusion algorithm to use convergent iterative a-priori probability calculations to produce the fusion output sequence; and
retrieving one or more stored speech utterances from a speech database based on at least one of the plurality of output symbol sequences or the fusion output symbol sequence.

12. The computer-readable storage device of claim 11, wherein the classifier ensemble includes a supervised classifier and an unsupervised classifier.

13. The computer-readable storage device of claim 11, wherein the converting includes using a classifier ensemble that includes at least two classifiers from a group of classifiers that comprises a Gaussian Mixture Model (GMM) classifier, a Hidden Markov Model (HMM) classifier, a Multi-level Preceptron (MLP) classifier.

14. The computer-readable storage device of claim 11, wherein the converting includes using a classifier ensemble that comprises at least two classifiers having different sets of classification classes, and wherein the output symbol sequences produced by the at least two classifiers include symbols that cover different durations within the speech utterance.

15. The computer-readable storage device of claim 11, wherein the transforming includes using a decoder ensemble that includes a Viterbi decoder having a wildcard probability category, the wildcard probability category to capture a symbol of one of the output symbol sequences that has no clear winning symbol probability.

16. The computer-readable storage device of claim 11, wherein the retrieving includes using an n-gram based scoring algorithm that associates the plurality of output symbol sequences in an union operation during retrieval of one or more speech utterances from a speech database.

17. The computer-readable storage device of claim 11, wherein the acts further comprise:
separating an input audio signal into voiced portions and unvoiced portions based at least on a smooth log power, a spectrum entropy, and a maximum amplitude in each of a plurality of frames included in the input audio signal; and
converting the voiced portions of the input audio signal into the plurality of feature vectors.

18. A method comprising:
segmenting an input audio signal into a plurality of frames using a frame capture component;
applying a first Discrete Cosine Transform (DCT) (Type II) to the noise-suppressed Mel filter coefficients to each frame of the plaurity of frames along a frequency direction to derive corresponding output coefficients;
populating a matrix with the output coefficients;
applying a second DCT (Type II) to the output coefficients in the matrix along a time direction to generated a de-correlated matrix for the plurality of frames;
applying a feature selection to the de-correlated matrix to extract feature vectors;
converting the feature vectors into log probability sets using a classifier ensemble that includes a plurality of classifiers;
transforming the log probability sets into an output symbol sequences using a decoder ensemble that includes a plurality of decoders;
combining the output symbol sequences into a fusion output symbol sequence using a block fusion algorithm, the block fusion algorithm to use convergent iterative a-priori probability calculations to produce the fusion output sequence; and
retrieving one or more stored speech utterances from a speech database based on at least one of the plurality of output symbol sequences or the fusion output symbol sequence.

19. The method of claim 18, further comprising:
performing pre-emphasis to remove low frequency tilt for each frame of voiced portions of an input audio signal;
applying a window function to each frame to facilitate frequency resolution;
applying a Fast Fourier Transform (FFT) to each frame to convert time domain signals into frequency domain signals;
computing an output power spectrum of FFT frequency domain signals of each frame;
performing Mel-filtering on the output power spectrum of each frame to generate Mel filter coefficients;
performing noise suppression on the Mel filter coefficients of each frame; and
obtaining logarithms of the noised-suppressed Mel Filter coefficients of each frame.

20. The method of claim 19, further comprising separating an input audio signal into voiced portions and unvoiced portions based at least on a smooth log power, a spectrum entropy, and a maximum amplitude in each of a plurality of frames included in the input audio signal.

* * * * *